(12) United States Patent
Sakamoto

(10) Patent No.: US 12,405,455 B2
(45) Date of Patent: Sep. 2, 2025

(54) ZOOM LENS AND IMAGE PICKUP APPARATUS

(71) Applicant: CANON KABUSHIKI KAISHA, Tokyo (JP)

(72) Inventor: Masaru Sakamoto, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 512 days.

(21) Appl. No.: 17/818,525

(22) Filed: Aug. 9, 2022

(65) Prior Publication Data

US 2023/0064725 A1 Mar. 2, 2023

(30) Foreign Application Priority Data

Aug. 12, 2021 (JP) .................................. 2021-131582

(51) Int. Cl.
*G02B 15/14* (2006.01)
*G02B 15/167* (2006.01)
*G02B 15/20* (2006.01)

(52) U.S. Cl.
CPC . *G02B 15/145125* (2019.08); *G02B 15/1461* (2019.08); *G02B 15/167* (2013.01); *G02B 15/20* (2013.01)

(58) Field of Classification Search
CPC .... G02B 15/145125; G02B 15/145127; G02B 15/1461; G02B 15/167; G02B 15/20
USPC ................................................. 359/683, 684
See application file for complete search history.

(56) References Cited

U.S. PATENT DOCUMENTS

| 2014/0204252 A1* | 7/2014 | Yoshimi ............. G02B 15/1461 359/683 |
| 2015/0301319 A1* | 10/2015 | Komatsu ............ G02B 27/1013 359/684 |
| 2016/0062091 A1* | 3/2016 | Wada ............. G02B 15/145121 359/683 |

(Continued)

FOREIGN PATENT DOCUMENTS

| JP | 2016-012118 A | 1/2016 |
| JP | 2021021902 A | 2/2021 |
| JP | 2021-032925 A | 3/2021 |

OTHER PUBLICATIONS

Warren J Smith; "Modern Lens Design;" Genesse Optics Software, Inc. Rochester, New York; Jan. 1, 1992; pp. 1-5.

(Continued)

*Primary Examiner* — Bumsuk Won
*Assistant Examiner* — Seth D Moser
(74) *Attorney, Agent, or Firm* — Canon U.S.A., Inc. IP Division

(57) ABSTRACT

A zoom lens includes, from an object side to an image side, a positive first lens unit configured not to move for zooming, at least three movable lens units configured to move for zooming, and a positive final lens unit closest to the image side in lens units and configured not to move for zooming. In the at least three movable lens units, a lens unit closest to the image side has a positive power, and a lens unit second closest to the image side has a negative power. The first lens unit includes a first sub unit closest to the object side and configured not to move for focusing and a second sub unit configured to move for focusing. The final lens unit includes a positive lens closest to the image side in elements having a refractive power in the final lens unit. Predetermined inequalities are satisfied.

18 Claims, 15 Drawing Sheets

(56) References Cited

U.S. PATENT DOCUMENTS

| | | | |
|---|---|---|---|
| 2016/0062096 A1* | 3/2016 | Hatada | G02B 27/0025 |
| | | | 348/240.3 |
| 2016/0091698 A1* | 3/2016 | Ikeda | G02B 15/1461 |
| | | | 359/683 |
| 2018/0143412 A1* | 5/2018 | Sakamoto | G02B 15/17 |
| 2021/0048654 A1* | 2/2021 | Ogawa | G02B 15/145125 |
| 2021/0048655 A1 | 2/2021 | Shimomura | |
| 2021/0278641 A1* | 9/2021 | Taki | G02B 15/144511 |

OTHER PUBLICATIONS

Herbert Gross; "Handbook of Optical Systems;" vol. 3: Aberration Theory and Correction of Optical Systems; Jan. 1, 2007; pp. 1-6.

* cited by examiner

ZOOM LENS AND IMAGE PICKUP APPARATUS

BACKGROUND

Technical Field

The aspect of the embodiments relates to a zoom lens and an image pickup apparatus.

Description of the Related Art

Zoom lenses are in demand to have high resolution uniformly from center to periphery of their angle of views and to cause less chromatic aberration. Japanese Patent Laid-Open No. 2016-012118 discloses a positive lead type zoom lens including, in order from an object side to an image side, a positive lens unit that does not move during zooming, a negative lens unit that moves during zooming, and a positive lens unit that moves during zooming.

Zoom lenses are also in demand to have wide angles, wide magnification ranges (high zoom ratios), high aperture ratios, and small sizes. Positive lead type zoom lenses are beneficial for increasing the zoom ratio as compared with negative lead type zoom lenses in each of which a first lens unit has a negative refractive index. However, in order that a positive lead type zoom lens is made to provide high optical performance, the positive lead type zoom lens is made to perform balanced correction on on-axis chromatic aberration and lateral chromatic aberration.

If the number of lenses is reduced so that a size of a zoom lens is reduced, and a refractive power of each lens unit or of a single lens is increased, chromatic aberration and other various errors may increase. If a wider angle of view and a higher zoom ratio are to be acquired, it may be difficult for the zoom lens to correct various aberrations, especially lateral chromatic aberration at a wide-angle end.

SUMMARY

A zoom lens according to one aspect of the embodiments includes, in order from an object side to an image side, a first lens unit having a positive refractive power and configured not to move for zooming, at least three movable lens units configured to move so that a distance between each pair of adjacent lens units therein changes for zooming, and a final lens unit disposed closest to the image side in lens units included in the zoom lens, having a positive refractive power, and configured not to move for zooming. A movable lens unit closest to the image side in the at least three movable lens units has a positive refractive power, and a movable lens unit second closest to the image side in the at least three movable lens units has a negative refractive power. The first lens unit includes a first sub unit closest to the object side and configured not to move for focusing, and a second sub unit configured to move for focusing. The final lens unit includes a positive lens closest to the image side in elements having a refractive power in the final lens unit. Following inequalities are satisfied:

$$62 \leq vdp \leq 81.54,$$

$$2.24 \leq Ndp + 0.01 vdp, \text{ and}$$

$$4 \leq Z \leq 50$$

where $vdp$ represents an Abbe number with respect to a d-line of the positive lens, $Ndp$ represents a refractive index with respect to the d-line of the positive lens, and $Z$ represents a zoom ratio of the zoom lens.

An apparatus including the above zoom lens also constitute another aspect of the embodiments of the present disclosure.

Further features of the disclosure will become apparent from the following description of exemplary embodiments with reference to the attached drawings.

DESCRIPTION OF THE EMBODIMENTS

Referring now to the accompanying drawings, a description will be given of embodiments according to the present disclosure.

First, prior to a specific description of Examples 1 to 7, a description is given of matters common to each example. A zoom lens according to each example is suitable as an image pickup optical system for an image pickup apparatus such as a still camera, a video camera, a TV camera, a cinema camera, and a monitoring camera. In the zoom lens according to each example, a lens unit or a sub unit is a group of one or a plurality of lenses that integrally move as a whole during zooming between a wide-angle end and a telephoto end and during focusing to an infinite distance side or to a close side. That is, a distance between each pair of adjacent lens units or sub units changes during zooming and focusing.

A lens unit may include an aperture diaphragm. The wide-angle end represents a zooming state with a maximum angle of view (shortest focal length), and the telephoto end represents a zooming state with a minimum angle of view (maximum focal length). Each lens unit that moves during zooming is located, in the state of the wide-angle end, at one end and, in the state of the telephoto end, at the other end of a mechanical or control movable range on an optical axis.

Figure 1:
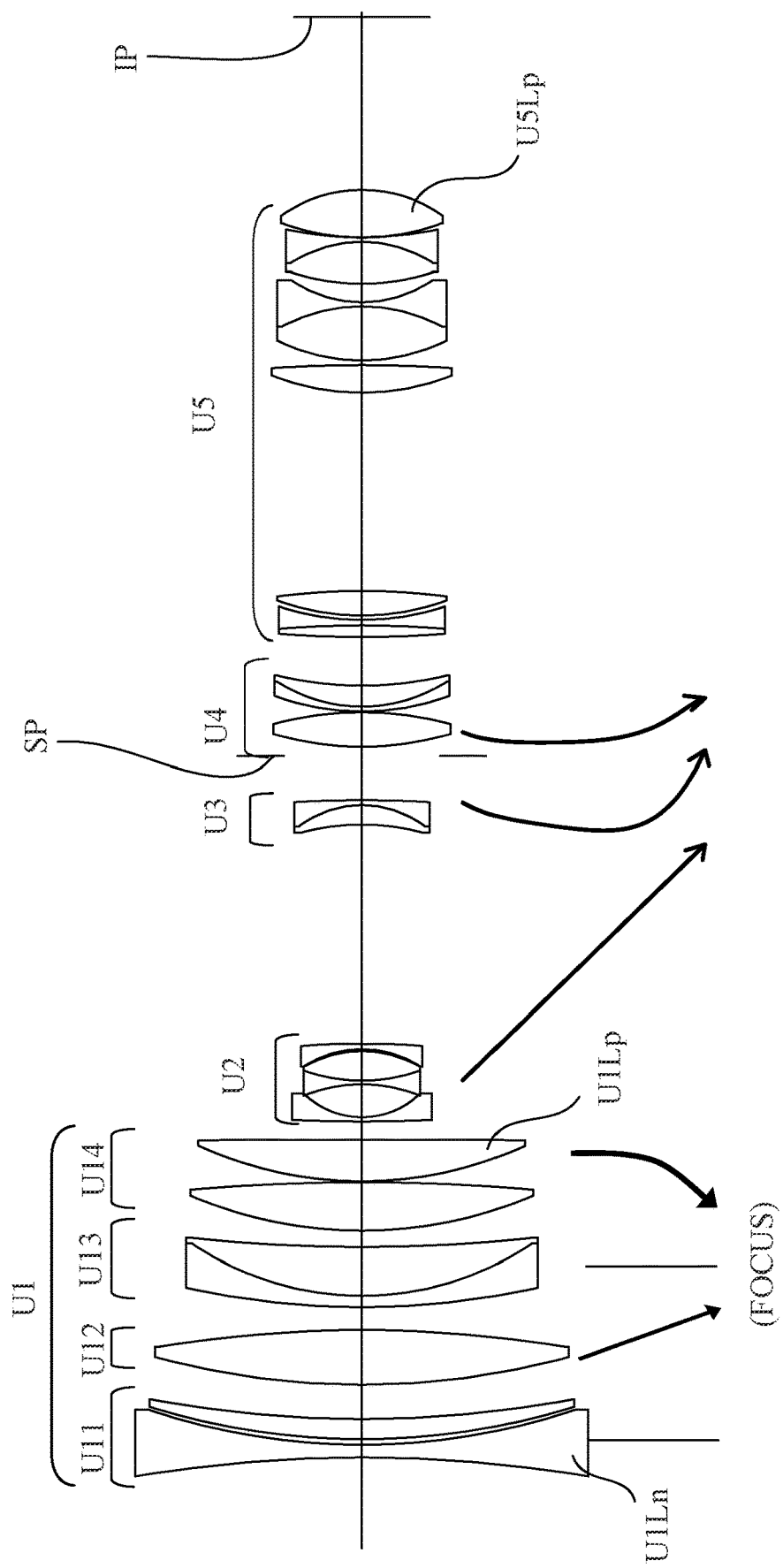
FIG. 1 is a sectional view of a zoom lens according to Example 1 (Numerical Example 1).
Figure 2A:
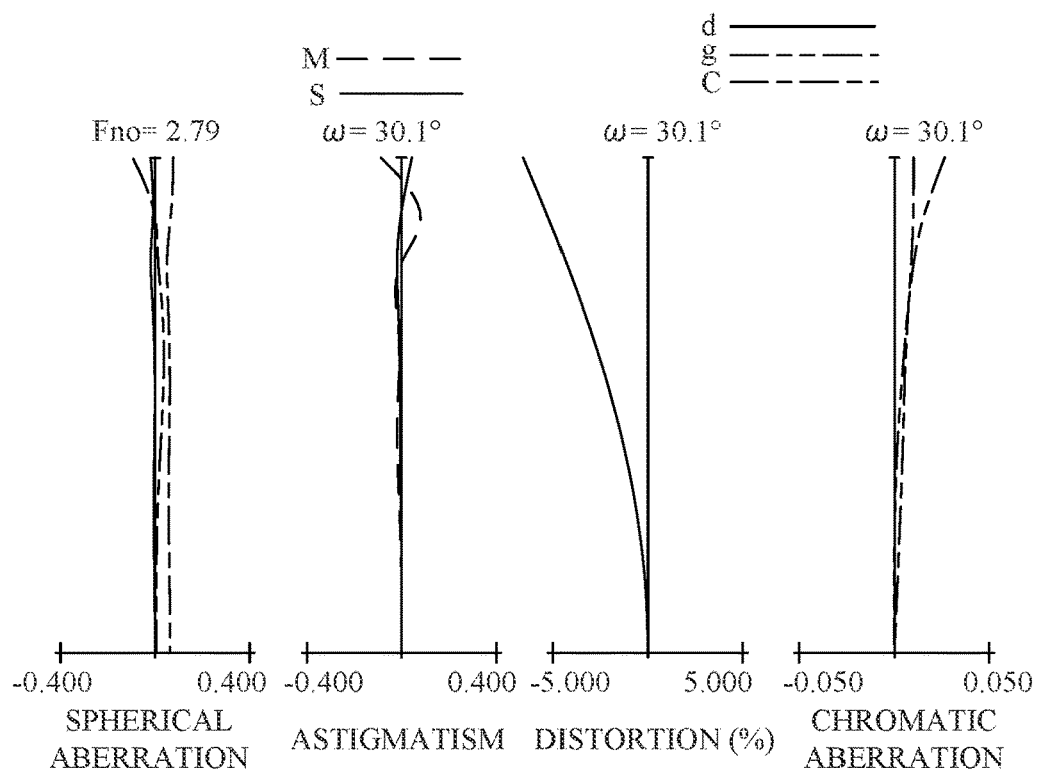
FIGS. 2A and 2B are aberration diagrams at a wide-angle end and a telephoto end of the zoom lens according to Example 1.
Figure 2B:
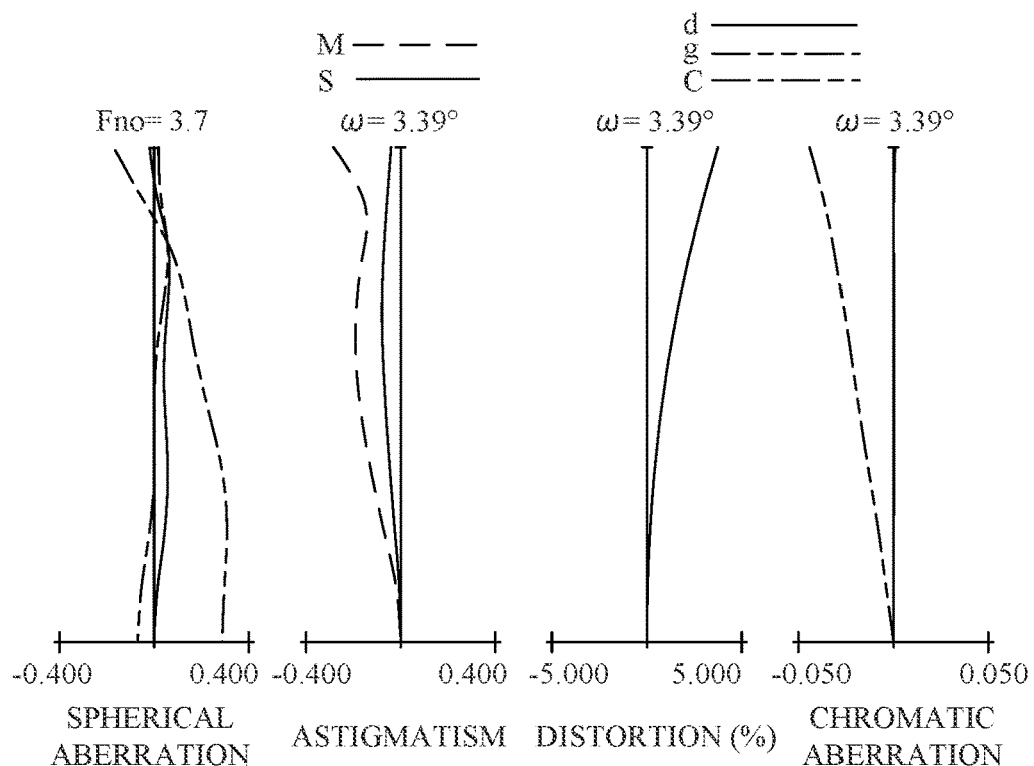

Next, a description is given of the zoom lens illustrated in FIG. 1 according to Example 1 as an example (with reference signs in parentheses).

The zoom lens according to each example includes, in order from an object side to an image side, a first lens unit (U1) that has a positive refractive power and does not move (is fixed) during (or for) zooming, at least three movable lens units (U2 to U4) that move so that a distance between each pair of adjacent lens units therein changes during (or for) zooming, and a final lens unit (U5) that is closest to the image side, has a positive refractive power, and does not move during (or for) zooming. In the above-described at least three movable lens units (U2 to U4), a movable lens unit (U4) closest to the image side has a positive refractive power, and a movable lens unit (U3) second closest to the image side has a negative refractive power. The first lens unit (U1) includes a fixed sub unit (U11) that is closest to the object side and does not move during (or for) focusing, and a movable sub unit (U12 and U14) that moves during (or for) focusing.

In this way, the zoom lens according to each example performs zooming by moving the at least three movable lens units (U2 to U4), increases a zoom ratio by using the negative movable lens unit (U3) second closest to the image side in the at least three movable lens units (U2 to U4), and effectively reduces (or corrects) an aberration variation during zooming by using the positive movable lens unit (U4) closest to the image side in the at least three movable lens units (U2 to U4). This makes it possible to realize a small-sized zoom lens that has a wide magnification range (high zoom ratio) and high optical performance.

In addition, by moving a part of the first lens unit (U1) during focusing and disposing the fixed sub unit (U11) at a position closest to the object side in the first lens unit (U1), it is possible to reduce an aberration variation caused by focusing. Further, it is possible to reduce sizes of the movable sub unit (U12, U14) that moves during focusing and of its driving mechanism, and thereby both high zoom ratio and size reduction can be realized.

The zoom lens according to each example further satisfies the following inequalities (1) to (3) in addition to the above-described configurations of the movable lens units and the first lens unit, so as to realize a zoom lens suitable for improving a definition and a function of an image pickup apparatus.

In the final lens unit (U5), a lens closest to the image side in elements having refractive powers is a positive lens (U5Lp). vdp and Ndp respectively represent an Abbe number with respect to a d-line and a refractive index with respect to the d-line of the positive lens U5Lp, and Z represents the zoom ratio of the zoom lens. Here, the zoom lens according to each example satisfies the following inequalities (1) to (3).

$$62 \leq vd \quad (1)$$

$$2.24 \leq Ndp + 0.01 vdp \quad (2)$$

$$4 \leq Z \leq 5 \quad (3)$$

The inequalities (1) and (2) represents conditions relating to characteristics of optical glass of the positive lens (U5Lp) closest to the image side in the final lens unit U5. Usually, optical glass contains a plurality of types of metal oxides such as $SiO_2$, $TiO_2$, $La_2O_3$, $Al_2O_3$, $Nb_2O_5$, $ZrO_2$, and $Gd_2O_3$. Among them, $TiO_2$ has an effect of increasing a refractive index and reducing an Abbe number. Therefore, optical glass with a high content of $TiO_2$ has a relatively high refractive index and a high dispersion. $Gd_2O_3$ has an effect of increasing a refractive index and increasing an Abbe number. Optical glass with a high content of $Gd_2O_3$ has a relatively high refractive index and a low dispersion. $TiO_2$ originally has a high refractive index and a high dispersion and $Gd_2O_3$ originally has a high refractive index and a low dispersion, and therefore the characteristics of optical glass containing them are similar to the original characteristics of the metal oxides.

As described above, optical glass has a property such that its characteristics change depending on contents of substances (components), and thus desired optical characteristics (refractive index and Abbe number) can be acquired by properly setting amounts of the substances. The same similarly applies to optical ceramics. For example, if optical ceramics includes a high content of a substance having a high refractive index and a low dispersion, the optical ceramics have relatively high refractive index and low dispersion. Therefore, it is possible to acquire an optical material such as optical glass and optical ceramics having desired optical characteristics if amounts of substances and metal oxides such as $SiO_2$, $TiO_2$, and $La_2O_3$ are properly set and are dissolved or sintered.

In the zoom lens having the above configurations, as the angle of view becomes wider, a refractive power of a negative lens (U1Ln) closest to the object side in the first lens unit U1 becomes stronger. Further, at the wide-angle end, a height increases of an off-axis principal ray entering the negative lens (U1Ln) closest to the object side in the first lens unit U1, and as a result, a generated amount of lateral chromatic aberration increases. Thus, the wider angle of view makes it difficult to correct the lateral chromatic aberration especially at the wide-angle end.

Further, as the zoom ratio becomes higher, a height of an on-axis ray in the first lens unit (U1) increases in proportion to a focal length, and as a result, on-axis chromatic aberration occurring in the first lens unit (U1) increases. In order that the on-axis chromatic aberration occurring in the first lens unit (U1) is reduced, optical glass having a high anomalous dispersion in a movable lens unit that has a strong negative refractive power and moves during zooming is used. A height of an off-axis principal ray entering the movable lens unit at the wide-angle end is high, and therefore large lateral chromatic aberration is caused by the optical glass having the high anomalous dispersion in the movable lens unit. Thus, increasing the zoom ratio also makes it difficult to correct the lateral chromatic aberration at the wide-angle end.

In general, a lens placed at a position at which a height of an off-axis ray is high has a large contribution to correction of lateral chromatic aberration. For correcting well the lateral chromatic aberration at the wide-angle end that occurs with widening the angle of view and increasing the zoom ratio, it is effective to use an optical material having a low dispersion and a high anomalous dispersion in the positive lens (U5Lp) at a position farthest from the aperture. In this positive lens (U5Lp), a chief paraxial ray, which has a large effect on lateral chromatic aberration, passes through a position where a height from the optical axis is high.

Therefore, using the above-described optical material for the positive lens (U5Lp) makes larger the effect on lateral chromatic aberration, and thus the lateral chromatic aberration can be corrected well.

The inequality (1) represents a condition relating to the Abbe number of the positive lens (U5Lp) closest to the image side in the final lens unit (U5). If vdp is smaller than the lower limit of the inequality (1), it is difficult to correct lateral chromatic aberration that occurs in the first lens unit (U1) and is insufficiently corrected by the first lens unit (U1). In addition, such an optical glass material makes the positive lens (U5Lp) have a small partial dispersion ratio θgF, which makes it difficult to correct a secondary spectrum of lateral chromatic aberration occurring in a movable lens unit having a strong negative refractive power that moves during zooming.

The numerical range of the inequality (1) may be set to a numerical range of the following inequality (4).

$$80 \leq vdp \quad (4)$$

The numerical range of the inequality (4) may be set to the following numerical range.

$$80 \leq vdp \leq 97 \quad (4a)$$

If vdp is larger than the upper limit of the inequality (4a), it is difficult to produce a low-dispersion optical glass material.

The inequality (2) represents a condition relating to a relationship between the Abbe number and the refractive index of the positive lens (U5Lp). If Ndp+0.01 vdp is smaller than the lower limit of the inequality (2), such an optical glass material makes the positive lens (U5Lp) have a small partial dispersion ratio θgF, which makes it difficult to correct a secondary spectrum of lateral chromatic aberration occurring in a movable lens unit having a strong negative refractive power that moves during zooming.

The numerical range of the inequality (2) may be set to the following numerical range.

$$2.24 \leq Ndp + 0.01vdp \leq 2.50 \quad (2a)$$

If Ndp+0.01 vdp is larger than the upper limit of the inequality (2a), it is difficult to produce an optical glass material having a low dispersion and a high refractive index.

The numerical range of the inequality (2) may be set to the following numerical range.

$$2.24 \leq Ndp + 0.01vdp \leq 2.40 \quad (2b)$$

The inequality (3) represents a condition for realizing a zoom lens having a large zoom ratio while having a small size. If Z is smaller than the lower limit of the inequality (3), it is difficult to increase the zoom ratio of the zoom lens. If Z is larger than the upper limit of the inequality (3), it is difficult to reduce the size of the zoom lens.

The numerical range of the inequality (3) may be set to the following numerical range.

$$4.3 \leq Z \leq 47.0 \quad (3a)$$

The numerical range of the inequality (3) may be set to the following numerical range.

$$4.4 \leq Z \leq 43.0 \quad (3b)$$

If the above-described conditions (inequalities) are satisfied, it is possible to realize a small-sized and light-weighted zoom lens having a wide angle of view, a large diameter, a high zoom ratio, and good optical performance.

The zoom lens according to each example may satisfy at least one of the following conditions (inequalities). In the zoom lens according to each example, the final lens unit (U5) may include four or more lenses each of which has a refractive power. When the number of lenses included in the final lens unit (U5) is properly set, it is possible to correct well various aberrations at the wide-angle end. The final lens unit (U5) may include at least six or more lenses each of which has a refractive power.

The zoom lens according to each example may satisfy the following inequality (5) where fp represents a focal length of the positive lens (U5Lp) closest to the image side in the final lens unit (U5), and fv represents a focal length of the lens unit (U2) having the strongest negative refractive power in the at least three movable lens units (U2 to U4).

$$0.5 \leq |fp/fv| \leq 50.0 \quad (5)$$

If |fp/fv| is larger than the upper limit of the inequality (5), the refractive power of the positive lens (U5Lp) is so weak that it becomes difficult to correct the lateral chromatic aberration at the wide-angle end. If |fp/fv| is smaller than the lower limit of the inequality (5), the refractive power of the positive lens (U5Lp) is so strong that the lateral chromatic aberration at the wide-angle end is excessively corrected. Further, since the refractive power of the positive lens (U5Lp) is strong, various aberrations occurring in the final lens unit (U5) increase, which makes it difficult to correct various aberrations in the wide-angle end.

The numerical range of the inequality (5) may be set to the following numerical range.

$$0.7 \leq |fp/fv| \leq 40.0 \quad (5a)$$

The numerical range of the inequality (5) may be set to the following numerical range.

$$0.85 \leq |fp/fv| \leq 35.00 \quad (5b)$$

The zoom lens according to each example may satisfy the following inequality (6) where Le represents a distance on the optical axis from a lens surface closest to the object side in the final lens unit (U5) to a lens surface closest to the image side in the final lens unit (U5), and fw represents a focal length at the wide-angle end of the zoom lens.

$$2.5 \leq Le/fw \leq 25.0 \quad (6)$$

If Le/fw is larger than the upper limit of the inequality (6), a height of an off-axis ray at the positive lens (U5Lp) is so high that it becomes difficult to reduce the size of the positive lens (U5Lp). If Le/fw is smaller than the lower limit of the inequality (6), the height of the off-axis ray at the positive lens (U5Lp) is so low that it becomes difficult to correct the lateral chromatic aberration at the wide-angle end.

The numerical range of the inequality (6) may be set to the following numerical range.

$$3.0 \leq Le/fw \leq 20.0 \quad (6a)$$

The numerical range of the inequality (6) may be set to the following numerical range.

$$3.5 \leq Le/fw \leq 17.0 \quad (6b)$$

In the zoom lens according to each example, the movable lens unit (U2) having the strongest negative refractive power in the at least three movable lens units (U2 to U4) each of which moves during zooming may include at least two negative lenses and one positive lens. Thereby, it is possible to realize a small zoom lens that has a high zoom ratio and high optical performance and is suitable for improving a definition and a function of an image pickup apparatus.

In the zoom lens according to each example, the first lens unit (U1) may include a positive lens (U1Lp) at a position closest to the image side. This makes it possible to realize a small zoom lens having a wide angle of view.

In the zoom lens according to each example, the lens unit (U2) having the strongest negative refractive power in the at least three movable lens units each of which moves during zooming may move to the image side during zooming from the wide-angle end to the telephoto end. This makes it possible to realize a small zoom lens having a high zoom ratio and high optical performance.

Hereinafter, a specific description is given of Examples 1 to 7. After the description of Example 7, Numerical Examples 1 to 7 corresponding to Examples 1 to 7 are given.

Example 1

A zoom lens according to Example 1 (Numerical Example 1) illustrated in FIG. 1 includes, in order from an object side to an image side, a first lens unit U1 having a positive refractive power, a second lens unit U2 having a negative refractive power, a third lens unit U3 having a negative refractive power, a fourth lens unit U4 having a positive refractive power, and a fifth lens unit U5 having a positive refractive power. FIG. 1 illustrates a lens structure at a wide-angle end and at a state of focusing on an object at an infinite distance. The zoom lens according to Numerical Example 1 has a zoom ratio of 9.8 and satisfies the inequality (3).

The first lens unit U1 is a lens unit fixed (that does not move) during zooming. The second to fourth lens units U2 to U4 are movable lens units each of which moves during zooming. As indicated by arrows below the second to fourth lens units U2 to U4 in the drawing, during zooming from the wide-angle end to the telephoto end, the second lens unit U2 moves to the image side, and the third lens unit U3 and fourth lens unit U4 move to the object side and then move to the image side. The fourth lens unit U4 includes an aperture diaphragm SP at a position close to the object side. The fifth lens unit U5 is a final lens unit fixed during zooming. IP represents an image plane. An image plane of an image sensor (image pickup element or photoelectric conversion element) or a photosensitive surface of a silver halide film is disposed on the image plane IP.

In the first lens unit U1, a sub unit U11 closest to the object side and a sub unit U13 third closest to the object side are fixed sub units each of which is fixed during focusing, and a sub unit U12 second closest to the object side and a sub unit U14 closest to the image side are movable sub units each of which moves during focusing. As indicated by arrows below the movable sub units U12 and U14 in the drawing, during focusing from an infinite distance side to a close side, the movable sub unit U12 moves to the image side, and the movable sub unit U14 moves to the object side.

In Numerical Example 1, the positive lens U5Lp closest to the image side in the fifth lens unit U5 satisfies the inequalities (1) to (2), the inequality (4), and the inequality (6). The movable lens unit having the strongest negative refractive power in the movable lens units is the second lens unit U2. The second lens unit U2 satisfies the inequality (5).

The first lens unit U1 includes a negative lens U1Ln at a position closest to the object side and a positive lens U1Lp at a position closest to the image side.

Example 2

Figure 3:
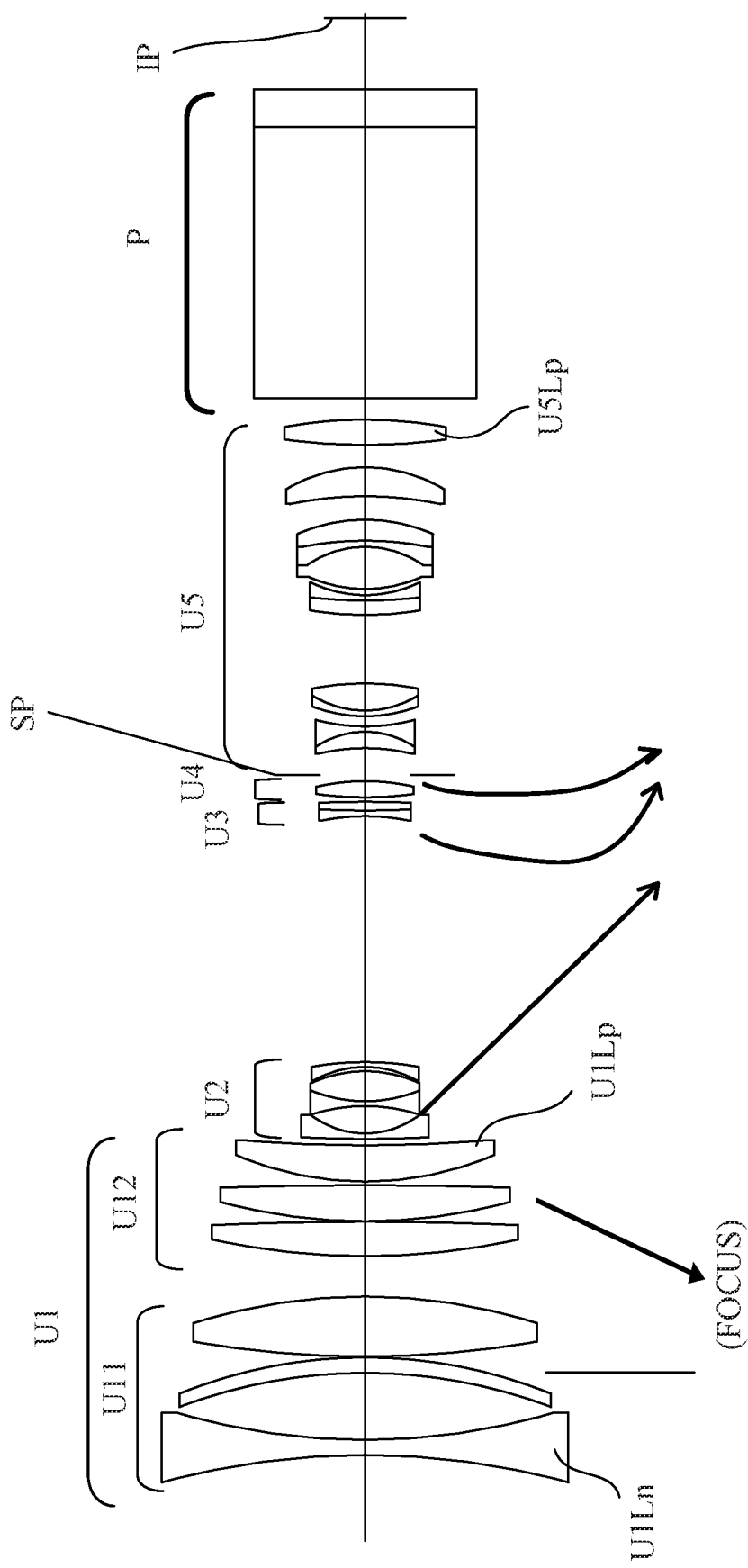
FIG. 3 is a sectional view of a zoom lens according to Example 2 (Numerical Example 2).
Figure 4A:
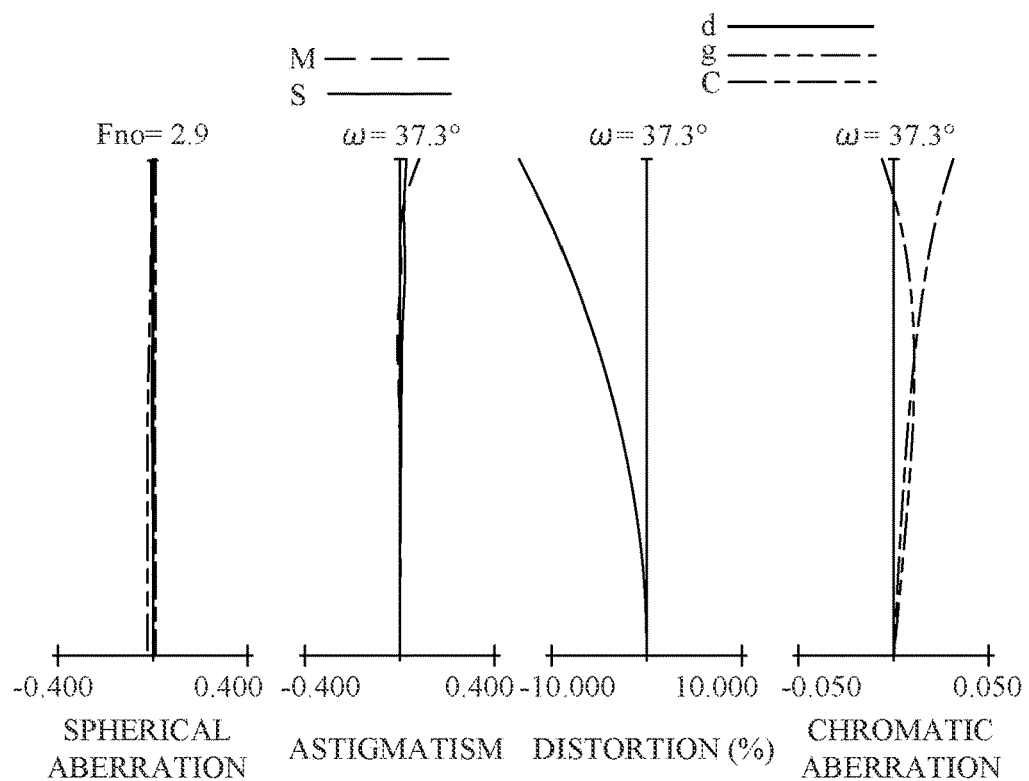
FIGS. 4A and 4B are aberration diagrams at a wide-angle end and a telephoto end of the zoom lens according to Example 2.
Figure 4B:
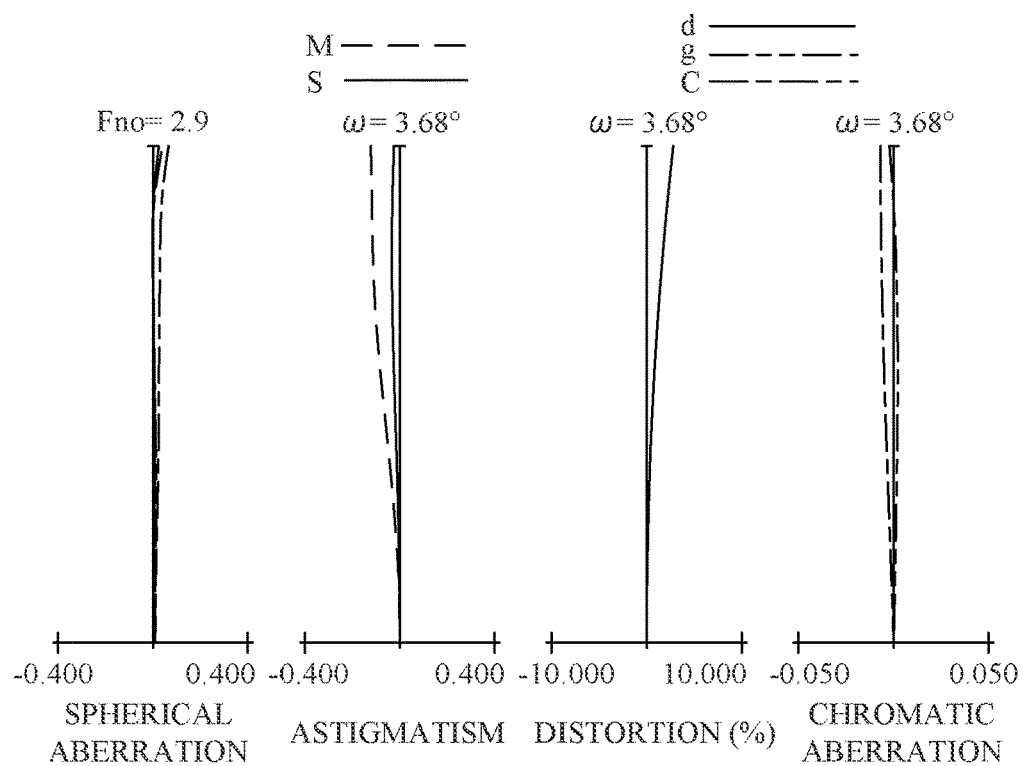

A zoom lens according to Example 2 (Numerical Example 2) illustrated in FIG. 3 includes, in order from an object side to an image side, a first lens unit U1 having a positive refractive power, a second lens unit U2 having a negative refractive power, a third lens unit U3 having a negative refractive power, a fourth lens unit U4 having a positive refractive power, and a fifth lens unit U5 having a positive refractive power. FIG. 3 illustrates a lens structure at a wide-angle end and at a state of focusing on an object at an infinite distance. The zoom lens according to Numerical Example 2 has a zoom ratio of 10.0 and satisfies the inequality (3). P in the drawing represents an optical element having no refractive power such as a prism.

The first lens unit U1 is a lens unit fixed during zooming. The second to fourth lens units U2 to U4 are movable lens units each of which moves during zooming. As indicated by arrows below the second to fourth lens units U2 to U4 in the drawing, during zooming from the wide-angle end to the telephoto end, the second lens unit U2 moves to the image side, and the third lens unit U3 and fourth lens unit U4 move to the object side and then move to the image side. The fourth lens unit U4 includes an aperture diaphragm SP at a position close to the object side. The fifth lens unit U5 is a final lens unit fixed during zooming.

In the first lens unit U1, a sub unit U1f closest to the object side is a fixed sub unit that is fixed during focusing, and a sub unit U12 second closest to the object side (closest to the image side) is a movable sub unit that moves during focusing. As indicated by an arrow below the movable sub unit U12 in the drawing, the movable sub unit U12 moves to the object side during focusing from an infinite distance side to a close side.

In Numerical Example 2, the positive lens U5Lp closest to the image side in the fifth lens unit U5 satisfies the inequalities (1) to (2), the inequality (4), and the inequality (6). The movable lens unit having the strongest negative refractive power in the movable lens units is the second lens unit U2. The second lens unit U2 satisfies the inequality (5).

The first lens unit U1 includes a negative lens U1Ln at a position closest to the object side and a positive lens U1Lp at a position closest to the image side.

Example 3

Figure 5:
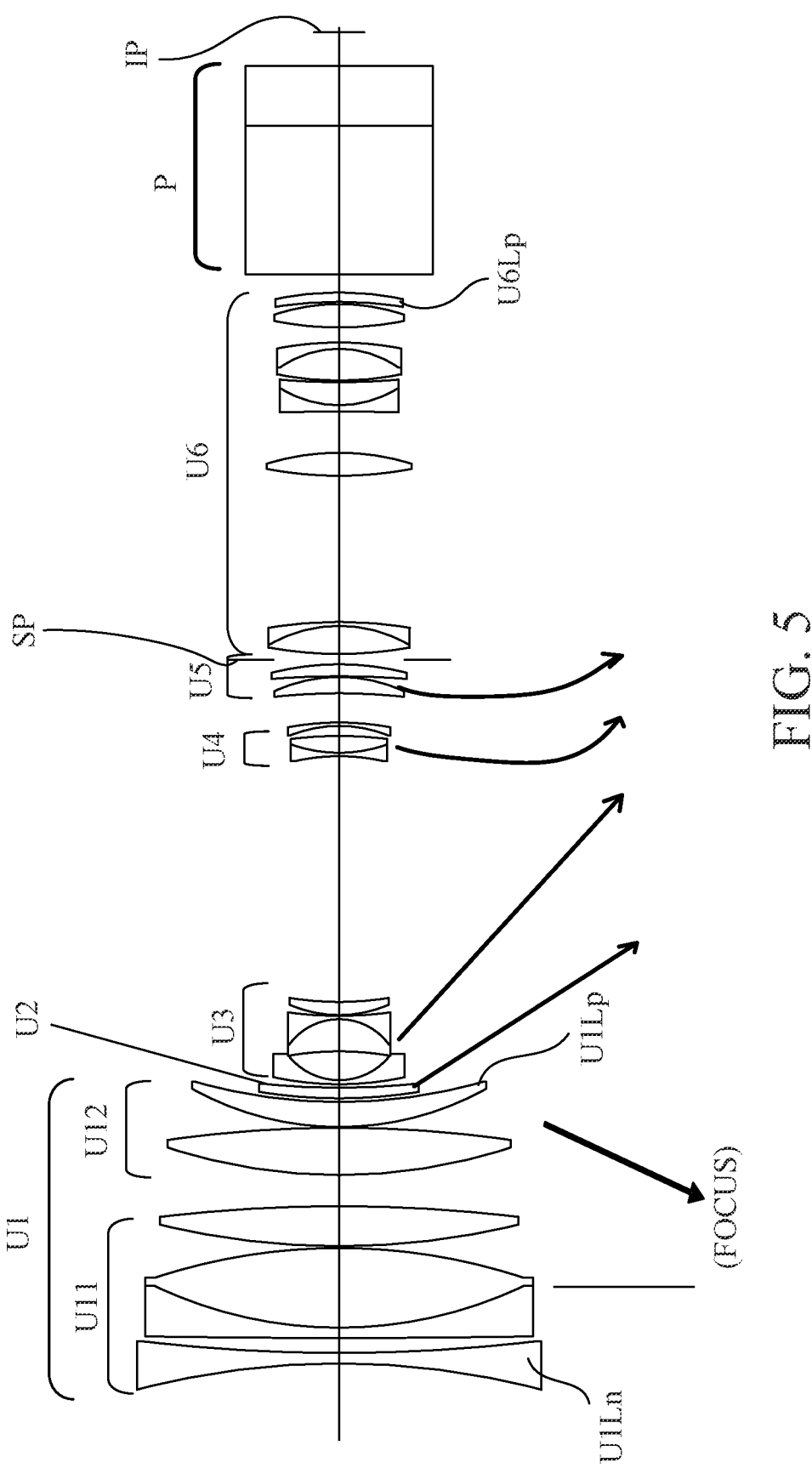
FIG. 5 is a sectional view of a zoom lens according to Example 3 (Numerical Example 3).
Figure 6A:
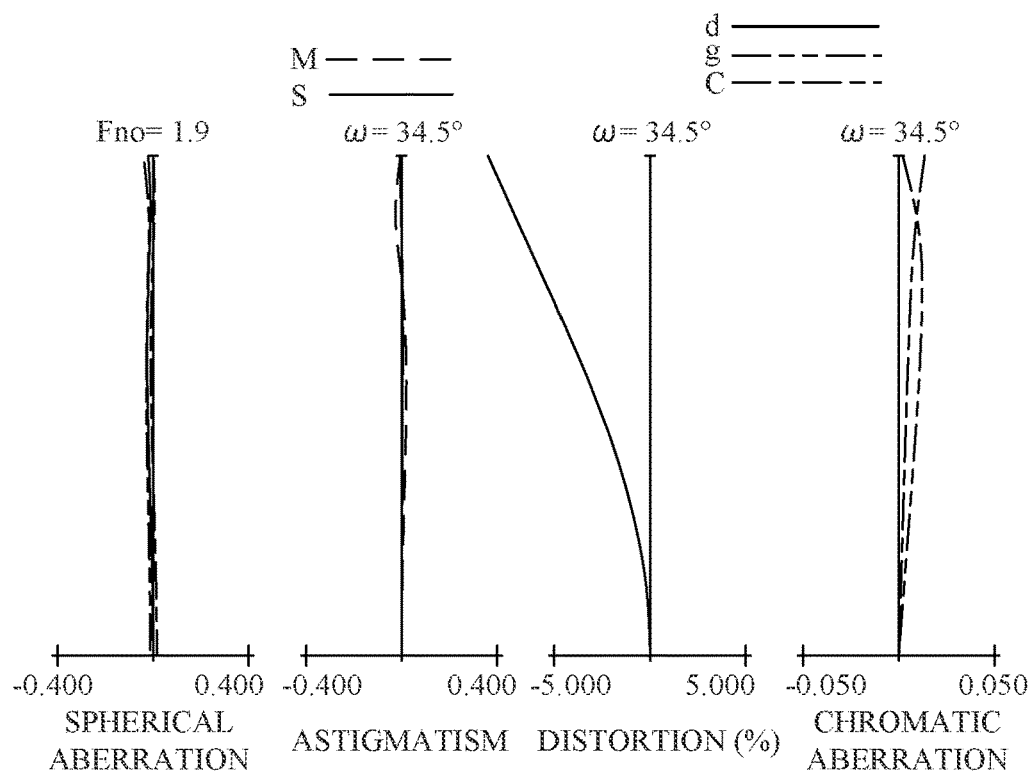
FIGS. 6A and 6B are aberration diagrams at a wide-angle end and a telephoto end of the zoom lens according to Example 3.
Figure 6B:
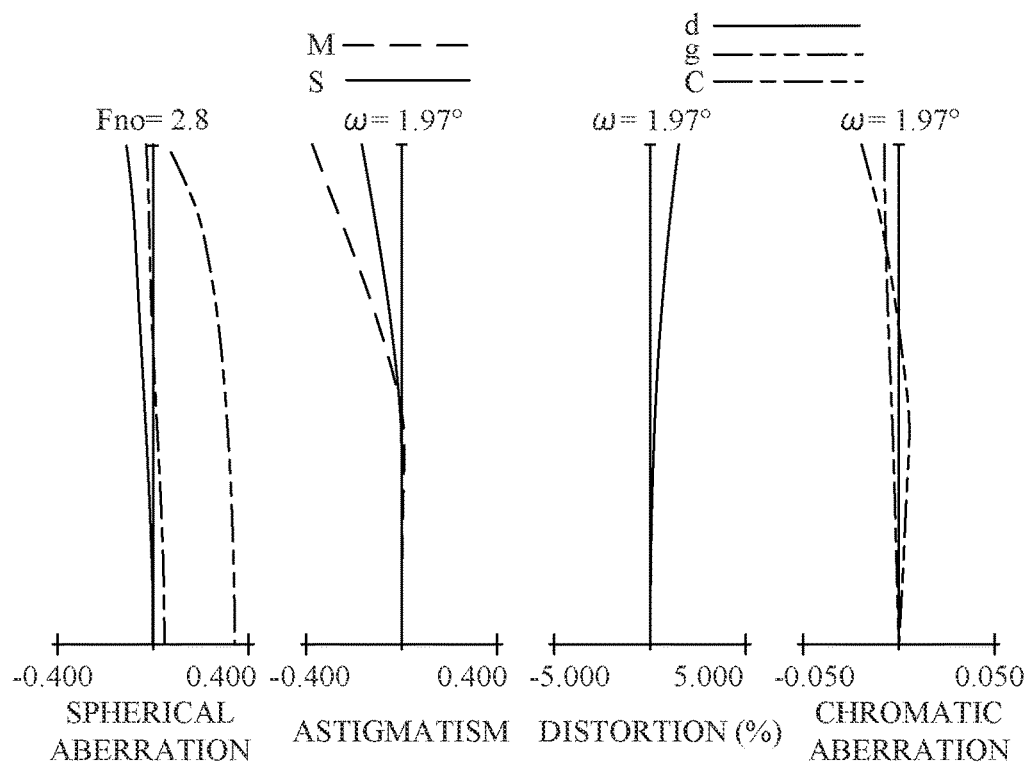

A zoom lens according to Example 3 (Numerical Example 3) illustrated in FIG. 5 includes, in order from an object side to an image side, a first lens unit U1 having a positive refractive power, a second lens unit U2 having a positive refractive power, a third lens unit U3 having a negative refractive power, a fourth lens unit U4 having a negative refractive power, a fifth lens unit U5 having a positive refractive power, and a sixth lens unit U6 having a positive refractive power. FIG. 5 illustrates a lens structure at a wide-angle end and at a state of focusing on an object at an infinite distance. The zoom lens according to Numerical Example 3 has a zoom ratio of 20.0 and satisfies the inequality (3).

The first lens unit U1 is a lens unit fixed during zooming. The second to fifth lens units U2 to U5 are movable lens units each of which moves during zooming. As indicated by arrows below the second to fifth lens units U2 to U5 in the drawing, during zooming from the wide-angle end to the telephoto end, the second lens unit U2 and the third lens unit U3 move to the image side, and the fourth lens unit U4 and the fifth lens unit U5 move to the object side and then move to the image side. The fifth lens unit U5 includes an aperture diaphragm SP at a position close to the image side. The sixth lens unit U6 is a final lens unit fixed during zooming.

In the first lens unit U1, a sub unit U1f closest to the object side is a fixed sub unit that is fixed during focusing, and a sub unit U12 second closest to the object side (closest to the image side) is a movable sub unit that moves during focusing. As indicated by an arrow below the movable sub unit U12 in the drawing, the movable sub unit U12 moves to the object side during focusing from an infinite distance side to a close side.

In Numerical Example 3, a positive lens U6Lp closest to the image side in the sixth lens unit U6 satisfies the inequalities (1) to (2), the inequality (4), and the inequality (6). The movable lens unit having the strongest negative refractive power in the movable lens units is the third lens unit U3. The third lens unit U3 satisfies the inequality (5).

The first lens unit U1 includes a negative lens U1Ln at a position closest to the object side and a positive lens U1Lp at a position closest to the image side.

Example 4

Figure 7:
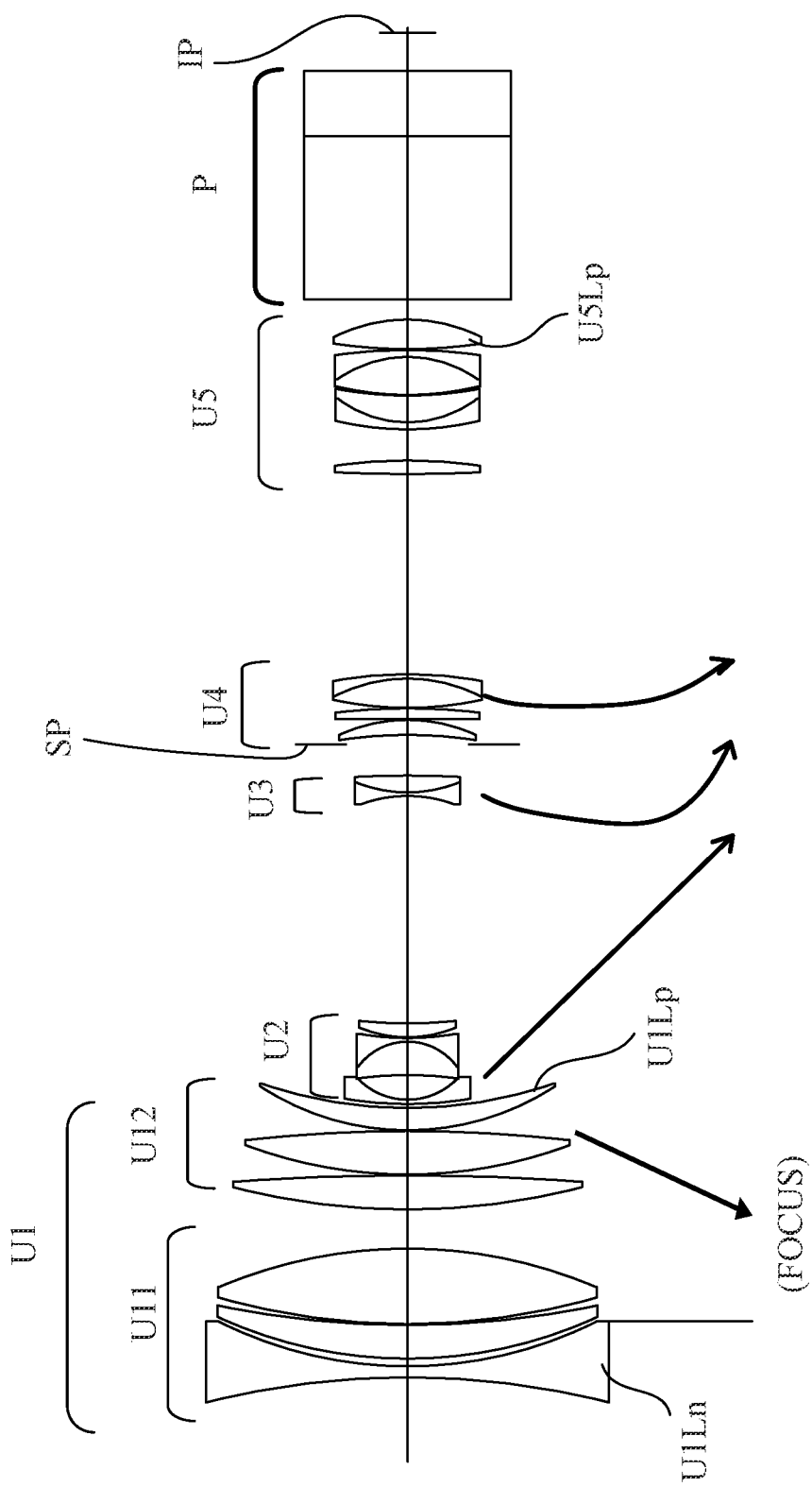
FIG. 7 is a sectional view of a zoom lens according to Example 4 (Numerical Example 4).
Figure 8A:
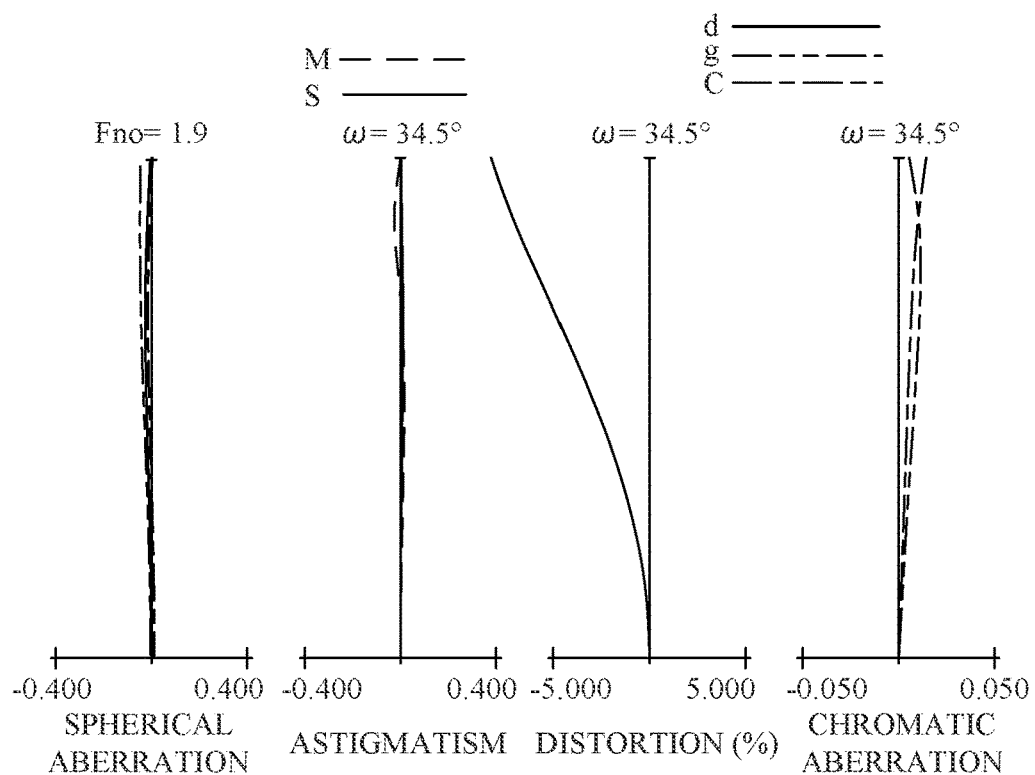
FIGS. 8A and 8B are aberration diagrams at a wide-angle end and a telephoto end of the zoom lens according to Example 4.
Figure 8B:
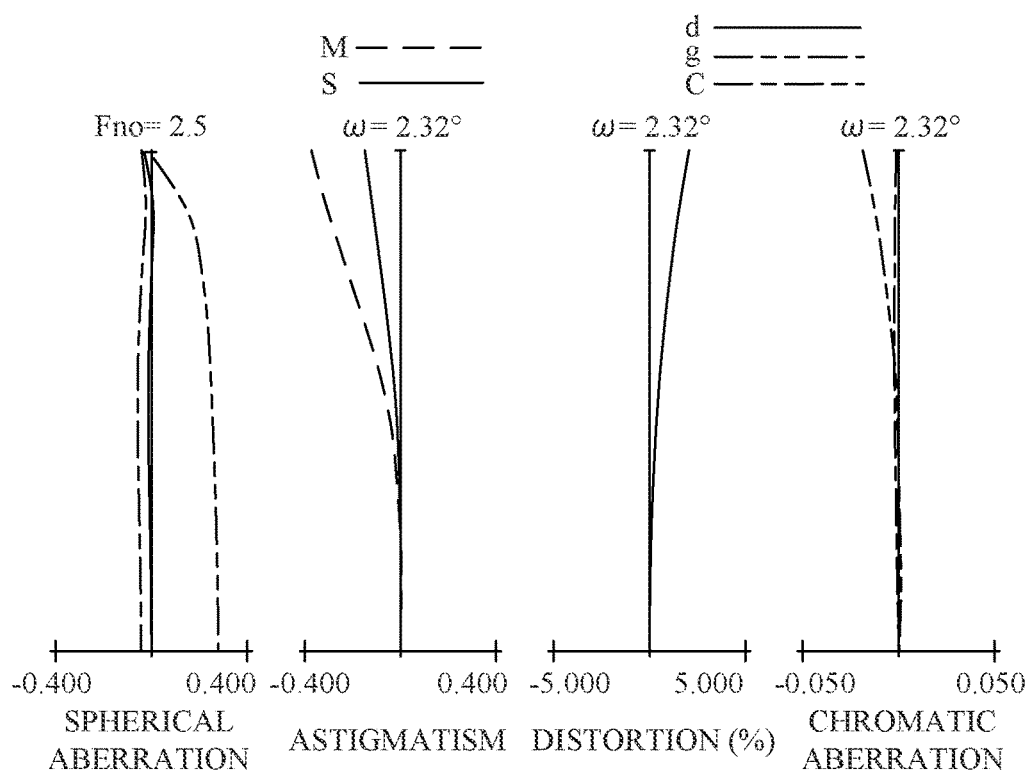

A zoom lens according to Example 4 (Numerical Example 4) illustrated in FIG. 7 includes, in order from an object side to an image side, a first lens unit U1 having a positive refractive power, a second lens unit U2 having a negative refractive power, a third lens unit U3 having a negative refractive power, a fourth lens unit U4 having a positive refractive power, and a fifth lens unit U5 having a positive refractive power. FIG. 7 illustrates a lens structure at a wide-angle end and at a state of focusing on an object at an infinite distance. The zoom lens according to Numerical Example 4 has a zoom ratio of 17.0 and satisfies the inequality (3).

The first lens unit U1 is a lens unit fixed during zooming. The second to fourth lens units U2 to U4 are movable lens units each of which moves during zooming. As indicated by arrows below the second to fourth lens units U2 to U4 in the drawing, during zooming from the wide-angle end to the telephoto end, the second lens unit U2 moves to the image side, and the third lens unit U3 and fourth lens unit U4 move to the object side and then move to the image side. The fourth lens unit U4 includes an aperture diaphragm SP at a position close to the object side. The fifth lens unit U5 is a final lens unit fixed during zooming.

In the first lens unit U1, a sub unit U1f closest to the object side is a fixed sub unit that is fixed during focusing, and a sub unit U12 second closest to the object side (closest to the image side) is a movable sub unit that moves during focusing. As indicated by an arrow below the movable sub unit U12 in the drawing, the movable sub unit U12 moves to the object side during focusing from an infinite distance side to a close side.

In Numerical Example 4, the positive lens U5Lp closest to the image side in the fifth lens unit U5 satisfies the inequalities (1) to (2), the inequality (4), and the inequality (6). The movable lens unit having the strongest negative refractive power in the movable lens units is the second lens unit U2. The second lens unit U2 satisfies the inequality (5).

The first lens unit U1 includes a negative lens U1Ln at a position closest to the object side and a positive lens U1Lp at a position closest to the image side.

Example 5

Figure 9:
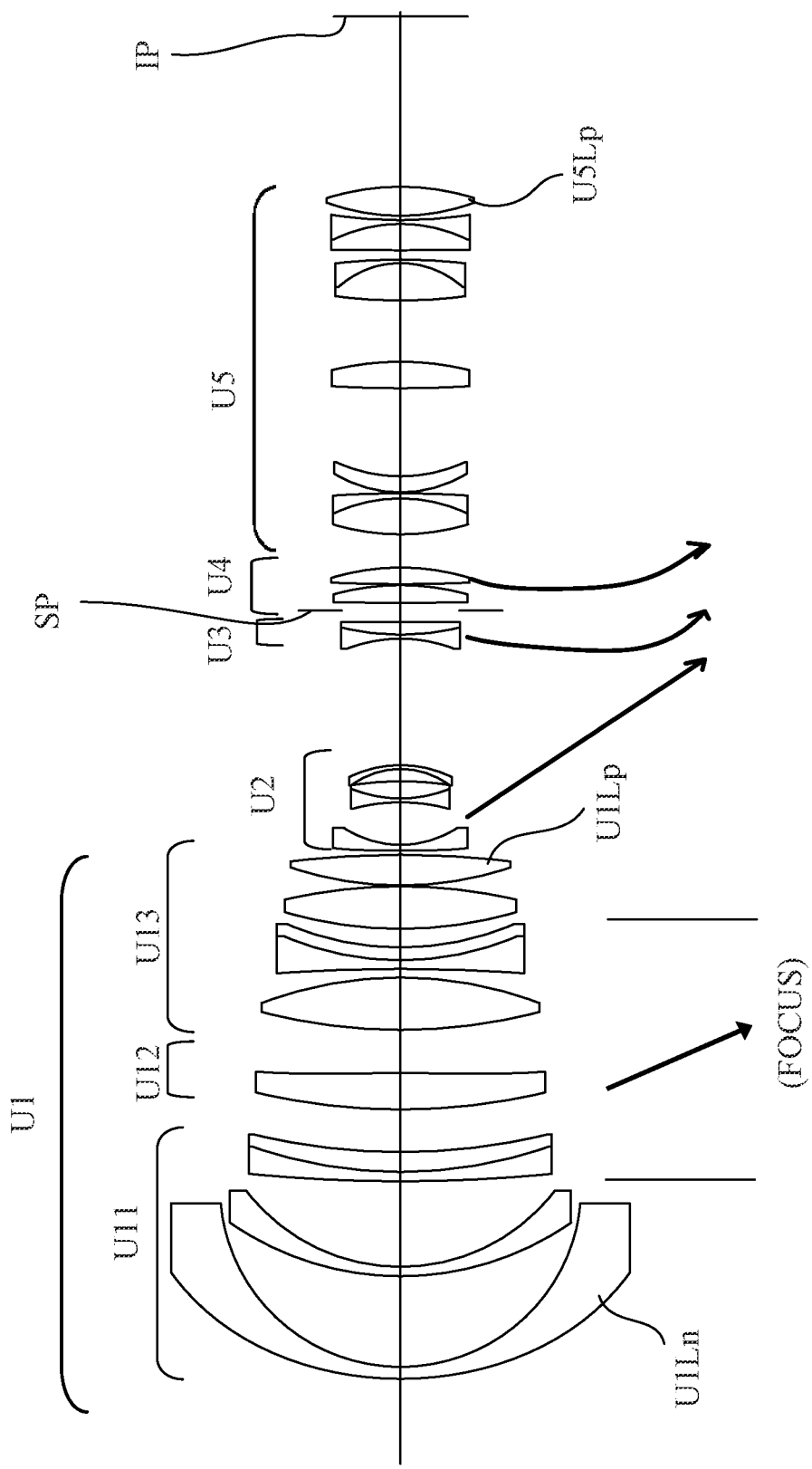
FIG. 9 is a sectional view of a zoom lens according to Example 5 (Numerical Example 5).
Figure 10A:
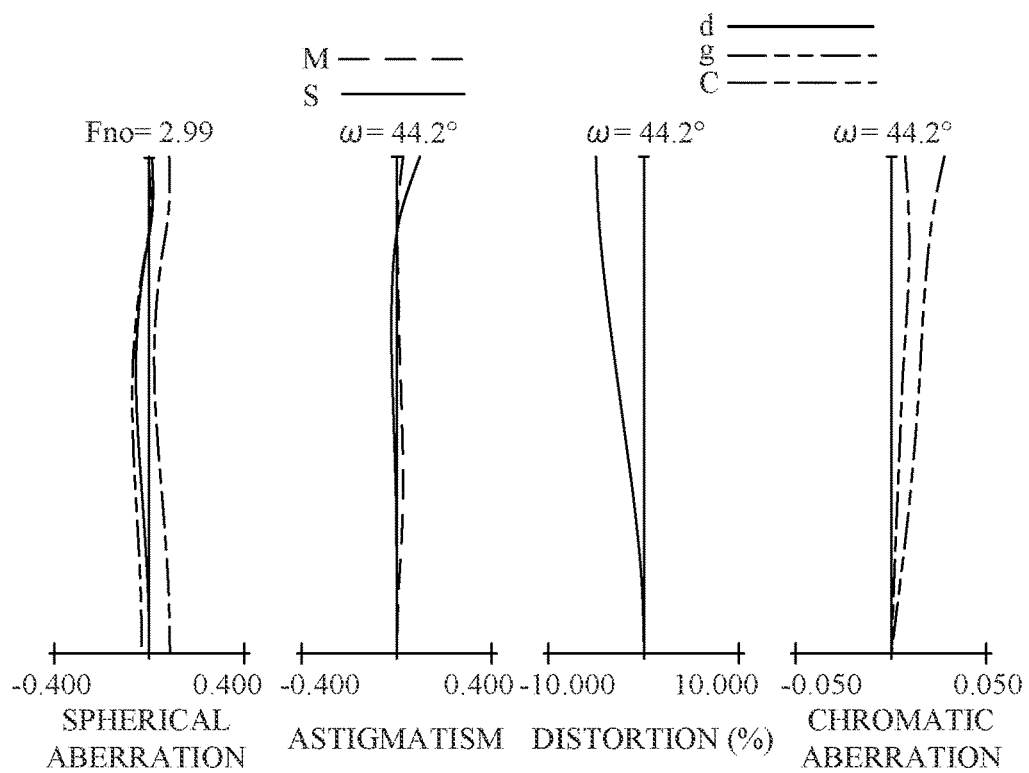
FIGS. 10A and 10B are aberration diagrams at a wide-angle end and a telephoto end of the zoom lens according to Example 5.
Figure 10B:
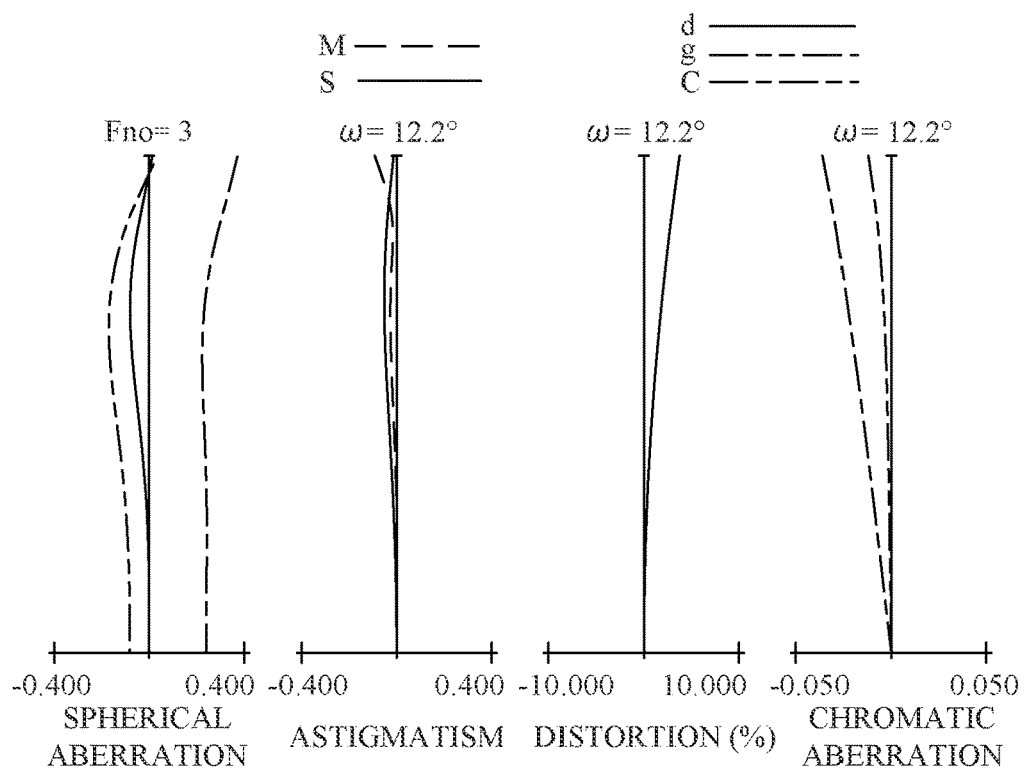

A zoom lens according to Example 5 (Numerical Example 55) illustrated in FIG. 9 includes, in order from an object side to an image side, a first lens unit U1 having a positive refractive power, a second lens unit U2 having a negative refractive power, a third lens unit U3 having a negative refractive power, a fourth lens unit U4 having a positive refractive power, and a fifth lens unit U5 having a positive refractive power. FIG. 9 illustrates a lens structure at a wide-angle end and at a state of focusing on an object at an infinite distance. The zoom lens according to Numerical Example 5 has a zoom ratio of 4.5 and satisfies the inequality (3).

The first lens unit U1 is a lens unit fixed during zooming. The second to fourth lens units U2 to U4 are movable lens units each of which moves during zooming. As indicated by arrows below the second to fourth lens units U2 to U4 in the drawing, during zooming from the wide-angle end to the telephoto end, the second lens unit U2 moves to the image side, and the third lens unit U3 and fourth lens unit U4 move to the object side and then move to the image side. The fourth lens unit U4 includes an aperture diaphragm SP at a position close to the object side. The fifth lens unit U5 is a final lens unit fixed during zooming.

In the first lens unit U1, a sub unit U1f closest to the object side and a sub unit U13 third closest to the object side (closest to the image side) are fixed sub units each of which is fixed during focusing, and a sub unit U12 second closest to the object side is a movable sub unit that moves during focusing. As indicated by an arrow below the movable sub unit U12 in the drawing, the movable sub unit U12 moves to the image side during focusing from an infinite distance side to a close side.

In Numerical Example 5, the positive lens U5Lp closest to the image side in the fifth lens unit U5 satisfies the inequalities (1) to (2), the inequality (4), and the inequality (6). The movable lens unit having the strongest negative refractive power in the movable lens units is the second lens unit U2. The second lens unit U2 satisfies the inequality (5).

The first lens unit U1 includes a negative lens U1Ln at a position closest to the object side and a positive lens U1Lp at a position closest to the image side.

Example 6

Figure 11:
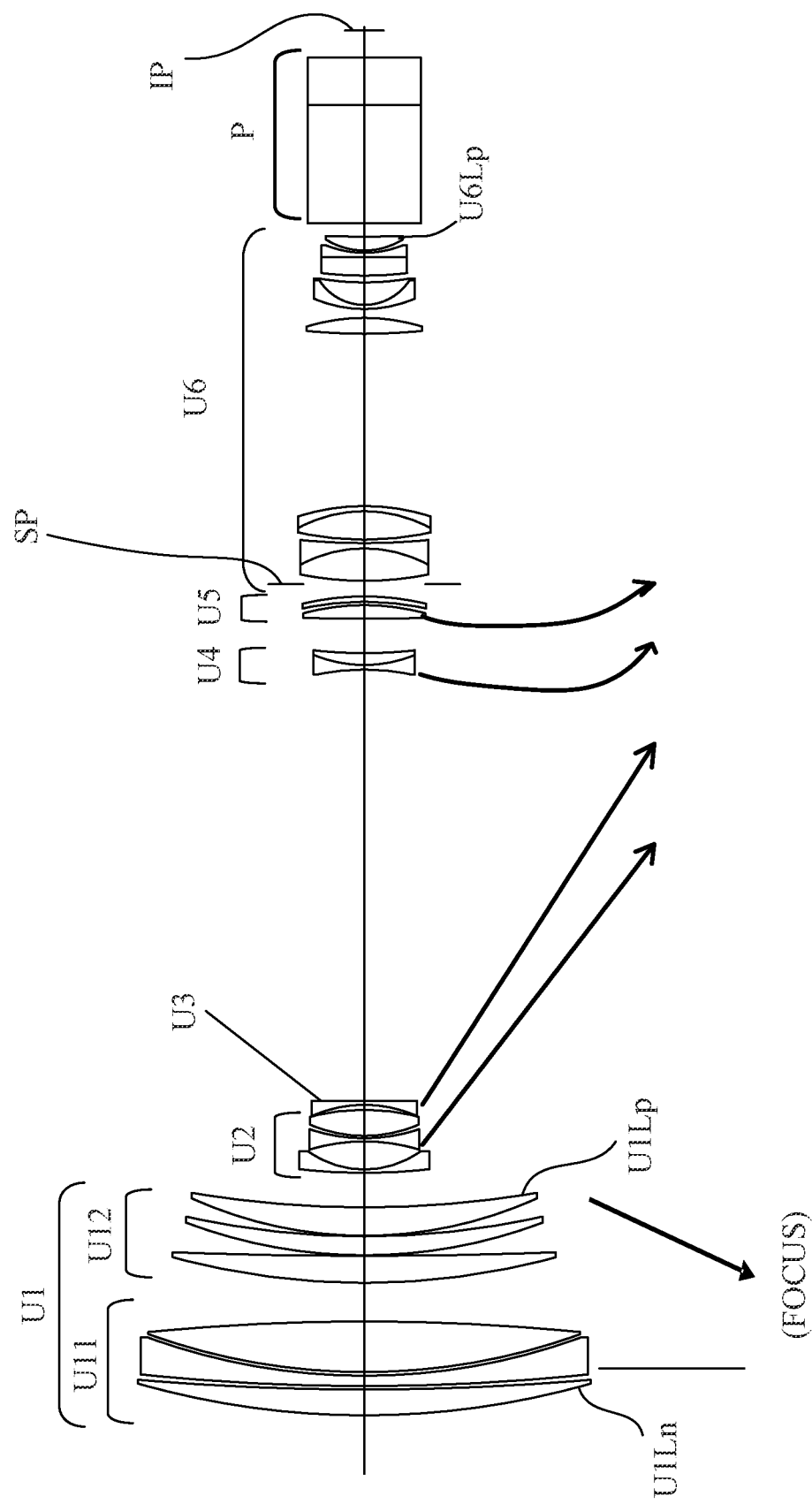
FIG. 11 is a sectional view of a zoom lens according to Example 6 (Numerical Example 6).
Figure 12A:
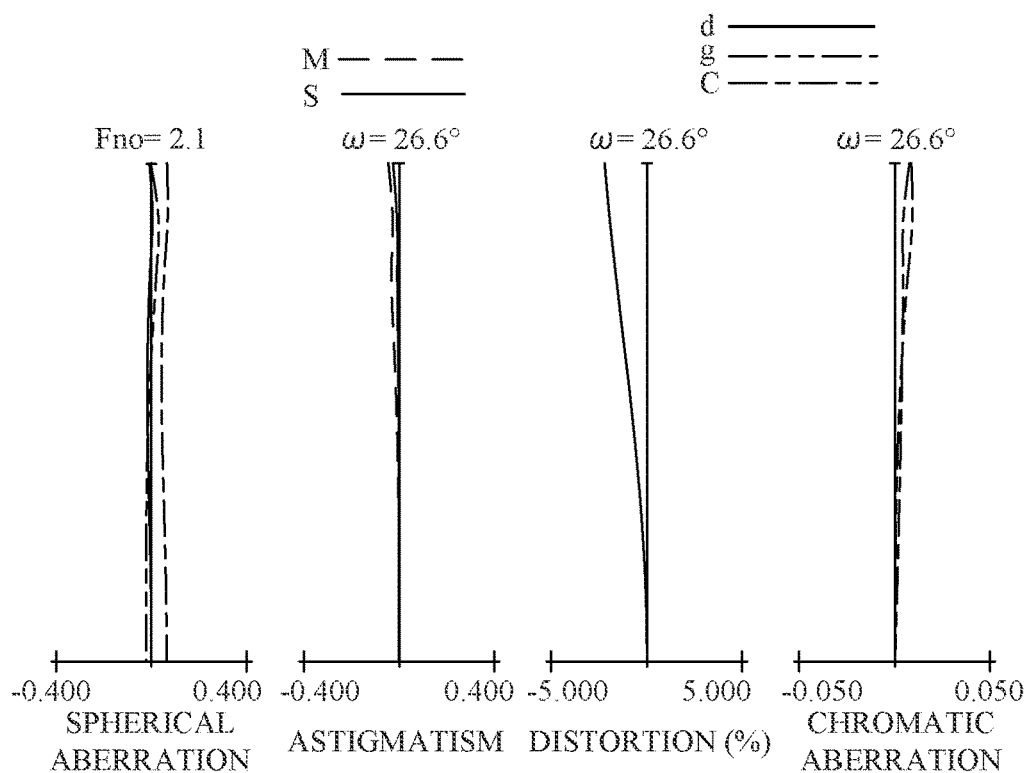
FIGS. 12A and 12B are aberration diagrams at a wide-angle end and a telephoto end of the zoom lens according to Example 6.
Figure 12B:
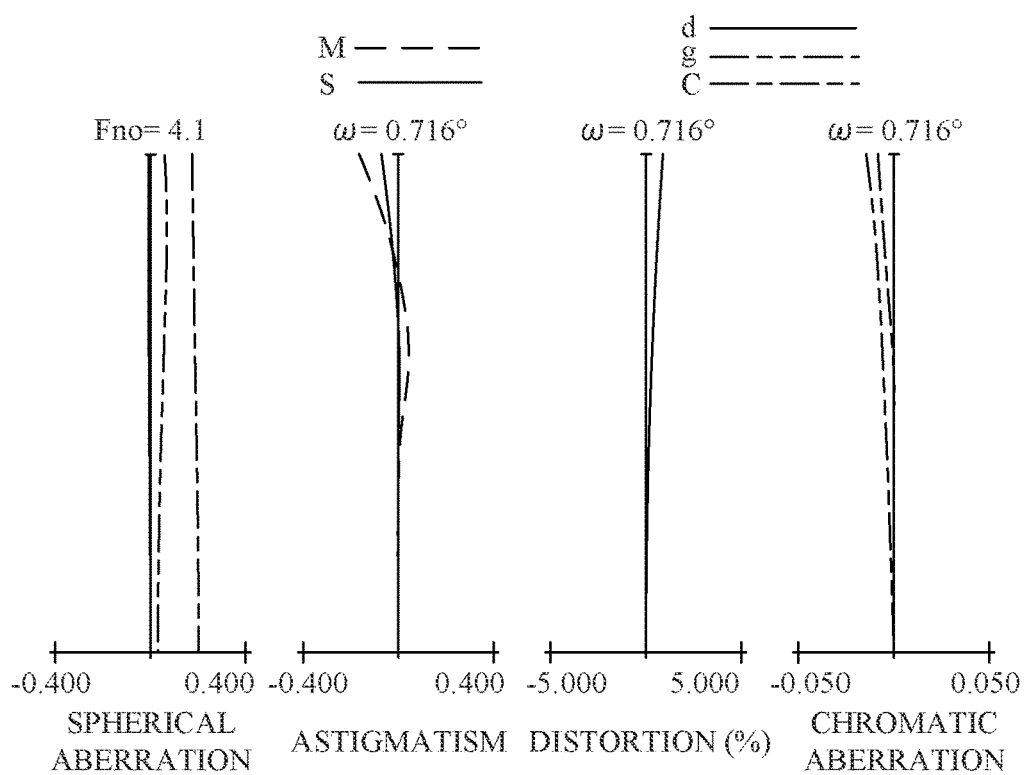

A zoom lens according to Example 6 (Numerical Example 6) illustrated in FIG. 11 includes, in order from an object side to an image side, a first lens unit U1 having a positive refractive power, a second lens unit U2 having a negative refractive power, a third lens unit U3 having a negative refractive power, a fourth lens unit U4 having a negative refractive power, a fifth lens unit U5 having a positive refractive power, and a sixth lens unit U6 having a positive refractive power. FIG. 11 illustrates a lens structure at a wide-angle end and at a state of focusing on an object at an infinite distance. The zoom lens according to Numerical Example 6 has a zoom ratio of 40.0 and satisfies the inequality (3).

The first lens unit U1 is a lens unit fixed during zooming. The second to fifth lens units U2 to U5 are movable lens units each of which moves during zooming. As indicated by arrows below the second to fifth lens units U2 to U5 in the drawing, during zooming from the wide-angle end to the telephoto end, the second lens unit U2 and the third lens unit U3 move to the image side and the fourth lens unit U4 and the fifth lens unit U5 move to the object side and then move to the image side. The sixth lens unit U6 is a final lens unit fixed during zooming and includes an aperture diaphragm SP at a position close to the object side.

In the first lens unit U1, a sub unit U1f closest to the object side is a fixed sub unit that is fixed during focusing, and a sub unit U12 second closest to the object side (closest to the image side) is a movable sub unit that moves during focusing. As indicated by an arrow below the movable sub unit U12 in the drawing, the movable sub unit U12 moves to the object side during focusing from an infinite distance side to a close side.

In Numerical Example 6, a positive lens U6Lp closest to the image side in the sixth lens unit U6 satisfies the inequalities (1) to (2), the inequality (4) and the inequality (6). The movable lens unit having the strongest negative refractive power in the movable lens units is the third lens unit U3. The third lens unit U3 satisfies the inequality (5).

The first lens unit U1 includes a negative lens U1Ln at a position closest to the object side and a positive lens U1Lp at a position closest to the image side.

Example 7

Figure 13:
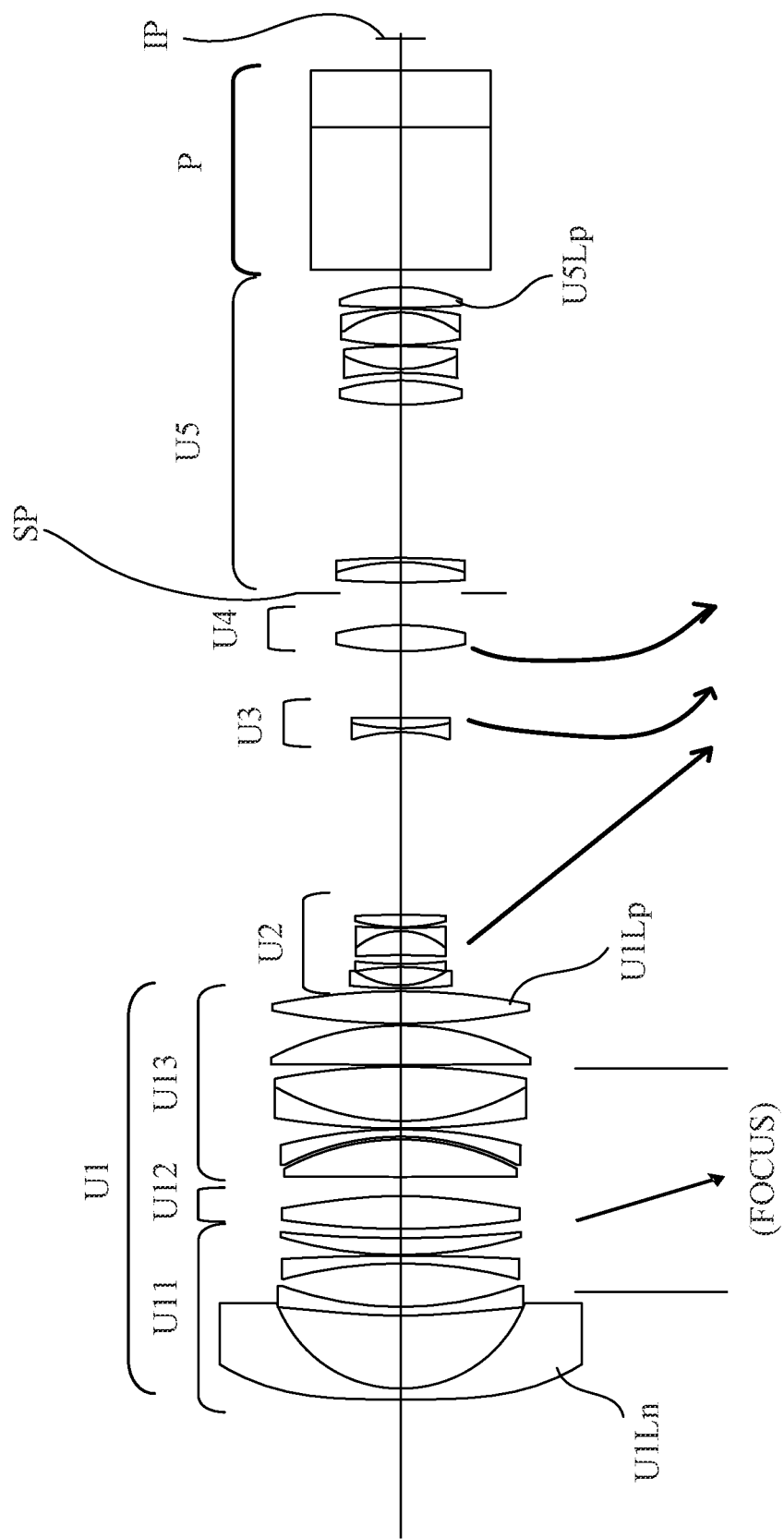
FIG. 13 is a sectional view of a zoom lens according to Example 7 (Numerical Example 7).
Figure 14A:
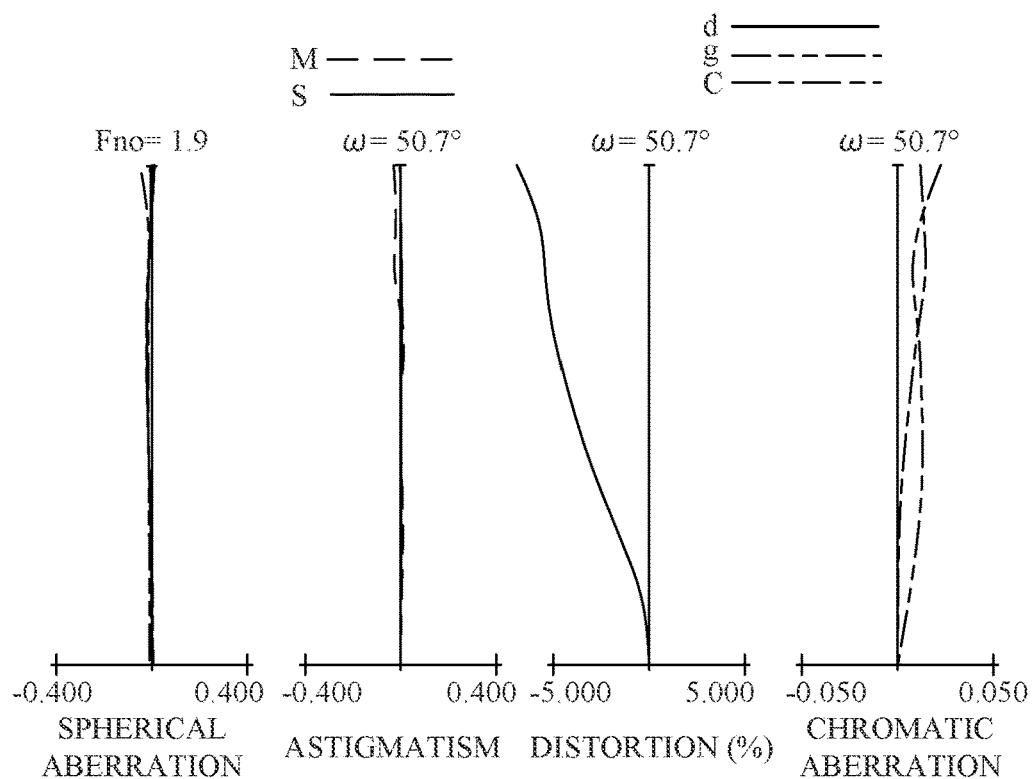
FIGS. 14A and 14B are aberration diagrams at a wide-angle end and a telephoto end of the zoom lens according to Example 7.
Figure 14B:
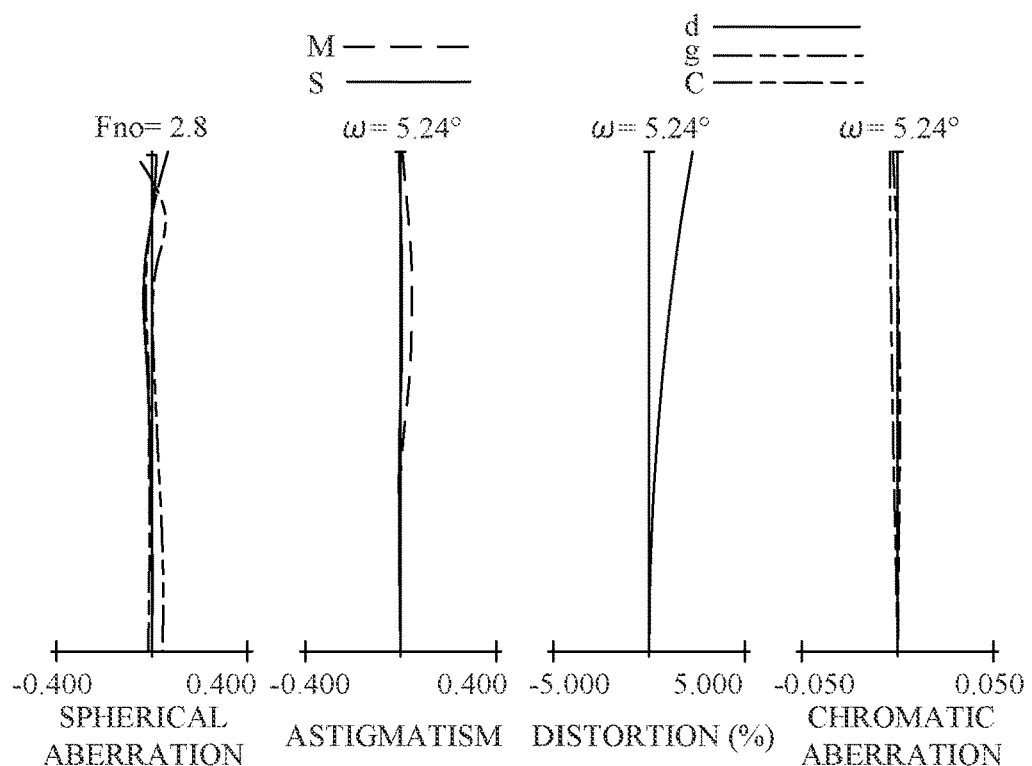

A zoom lens according to Example 7 (Numerical Example 7) illustrated in FIG. 13 includes, in order from an object side to an image side, a first lens unit U1 having a positive refractive power, a second lens unit U2 having a negative refractive power, a third lens unit U3 having a negative refractive power, a fourth lens unit U4 having a positive refractive power, and a fifth lens unit U5 having a positive refractive power. FIG. 13 illustrates a lens structure at a wide-angle end and at a state of focusing on an object at an infinite distance. The zoom lens according to Numerical Example 7 has a zoom ratio of 13.33 and satisfies the inequality (3).

The first lens unit U1 is a lens unit fixed during zooming. The second to fourth lens units U2 to U4 are movable lens units each of which moves during zooming. As indicated by arrows below the second to fourth lens units U2 to U4 in the drawing, during zooming from the wide-angle end to the telephoto end, the second lens unit U2 moves to the image side, and the third lens unit U3 and fourth lens unit U4 move to the object side and then move to the image side. The fifth lens unit U5 is a final lens unit fixed during zooming and includes an aperture diaphragm SP at a position close to the object side.

In the first lens unit U1, a sub unit U1f closest to the object side and a sub unit U13 third closest to the object side (closest to the image side) are fixed sub units each of which is fixed during focusing, and a sub unit U12 second closest to the object side is a movable sub unit that moves during focusing. As indicated by an arrow below the movable sub unit U12 in the drawing, the movable sub unit U12 moves to the image side during focusing from an infinite distance side to a close side.

In Numerical Example 7, the positive lens U5Lp closest to the image side in the fifth lens unit U5 satisfies the inequalities (1) to (2) and the inequality (6) but does not satisfy the inequality (4). The movable lens unit having the strongest negative refractive power in the movable lens units is the second lens unit U2. The second lens unit U2 satisfies the inequality (5).

The first lens unit U1 includes a negative lens U1Ln at a position closest to the object side and a positive lens U1Lp at a position closest to the image side.

FIGS. 2A, 4A, 6A, 8A, 10A, 12A, and 14A illustrate longitudinal aberrations (spherical aberration, astigmatism, distortion, and chromatic aberration) of the respective zoom lenses according to Numerical Examples 1 to 7 each of which is at the wide-angle end and focuses on an object at an infinite distance. FIGS. 2B, 4B, 6B, 8B, 10B, 12B, and 14B illustrate longitudinal aberrations (spherical aberration, astigmatism, distortion, and chromatic aberration) of the respective zoom lenses according to Numerical Examples 1 to 7 each of which is at the telephoto end and focuses on an object at an infinite distance. In each spherical aberration diagram, Fno represents an F number. A solid line represents spherical aberration at a d-line (wavelength 587.6 nm), a two-dot chain line represents spherical aberration at a g-line (wavelength 435.8 nm), and a one-dot chain line represents spherical aberration at a C-line (wavelength 656.3 nm). In each astigmatism diagram, a solid line S represents a sagittal image plane, and a broken line M represents a meridional image plane. Each distortion diagram illustrates distortion at the d-line. In each chromatic aberration diagram, a two-dot chain line represents lateral chromatic aberration at the g-line, and a one-dot chain line represents lateral chromatic aberration at the C-line. ω represents a half angle of view) (°).

Hereinafter, Numerical Examples 1 to 7 are given. In each Numerical Example, a surface number i represents an order of a surface counted from the object side. r represents a curvature radius (mm) of an i-th surface counted from the object side, d represents a lens thickness or an air distance (mm) between the i-th and an (i+1)-th surface, and nd represents a refractive index at the d-line of an optical material between the i-th surface and the (i+1)-th surface. vd represents an Abbe number at the d-line of the optical material between the i-th surface and the (i+1)-th surface. BF represents a back focus (mm). A "back focus" is an air conversion length of a distance on an optical axis from a final surface (a lens surface closest to the image side) of the zoom lens to a paraxial image plane. A "total lens length" is a length acquired by adding the back focus to a distance on the optical axis from a front surface (a lens surface closest to the object side) of the zoom lens to the final surface.

The Abbe number vd is expressed by the following equation where Nd, NF, and NC respectively represent refractive indexes at the d-line (587.6 nm), an F-line (486.1 nm), and the C-line (656.3 nm) of Fraunhofer lines.

$$vd=(Nd-1)/(NF-NC)$$

"*" attached to the surface number represents that the surface has an aspherical shape. The aspherical shape is expressed by the following equation where, when an optical axis direction is assumed to be an X axis, a direction orthogonal to the optical axis is assumed to be an H axis, and a light traveling direction is assumed to be positive, R represents a paraxial curvature radius, K represents a conical constant, A3, A4, A5, A6, A7, A8, A9, A10, A11, A12, A13, A14, A15, and A16 represent aspherical coefficients.

$$X = \frac{\frac{H^2}{R}}{1+\sqrt{1-(1+k)(H/R)^2}} + A4H^4 + A6H^6 +$$
$$A8H^8 + A10H^{10} + A12H^{12} + A14H^{14} + A16H^{16} + A3H^3 +$$
$$A5H^5 + A7H^7 + A9H^9 + A11H^{11} + A13H^{13} + A15H^{15}$$

In conic constants and aspherical coefficients, "e-x" represents ×10$^{-x}$.

Table 1 summarizes values of each inequality in Numerical Examples 1 to 7.

Numerical Example 1

| | Unit: mm | | | |
|---|---|---|---|---|
| | SURFACE DATA | | | |
| Surface Number | r | d | nd | vd |
| 1 | −291.688 | 2.80 | 1.80100 | 35.0 |
| 2 | 144.078 | 1.21 | | |
| 3 | 153.543 | 4.43 | 1.95906 | 17.5 |
| 4 | 243.217 | 1.68 | | |
| 5 | 168.214 | 12.15 | 1.60311 | 60.6 |
| 6* | −244.858 | 10.85 | | |
| 7 | 173.088 | 2.50 | 1.83400 | 37.2 |
| 8 | 65.624 | 10.67 | 1.43875 | 94.7 |
| 9 | 340.161 | 6.61 | | |
| 10 | 93.619 | 10.70 | 1.43387 | 95.1 |
| 11 | −422.601 | 0.20 | | |
| 12 | 84.501 | 9.16 | 1.59522 | 67.7 |
| 13 | −5841.261 | (Variable) | | |
| 14 | 305.506 | 0.95 | 1.75500 | 52.3 |
| 15 | 18.046 | 7.33 | | |
| 16 | −32.262 | 0.75 | 1.49700 | 81.5 |
| 17 | 37.702 | 6.51 | 1.83400 | 37.2 |
| 18 | −25.260 | 0.43 | | |
| 19 | −23.116 | 1.20 | 1.77250 | 49.6 |
| 20* | −314.961 | (Variable) | | |
| 21 | −50.584 | 4.31 | 1.80810 | 22.8 |
| 22 | −22.449 | 1.10 | 1.80100 | 35.0 |
| 23 | −242.799 | (Variable) | | |
| 24 (Diaphragm) | ∞ | 2.00 | | |
| 25* | 60.959 | 7.61 | 1.64000 | 60.1 |
| 26 | −74.522 | 0.19 | | |
| 27 | 54.596 | 1.10 | 1.85478 | 24.8 |
| 28 | 34.089 | 4.63 | 1.48749 | 70.2 |
| 29 | 78.845 | (Variable) | | |
| 30 | 227.612 | 2.57 | 1.48749 | 70.2 |
| 31 | −207.293 | 1.20 | 2.00100 | 29.1 |
| 32 | 57.206 | 0.98 | | |
| 33 | 53.608 | 5.46 | 1.83400 | 37.2 |
| 34 | −137.066 | 43.57 | | |
| 35 | 53.272 | 6.12 | 1.43875 | 94.7 |
| 36 | −288.236 | 0.96 | | |
| 37 | 40.968 | 11.95 | 1.80810 | 22.8 |
| 38 | −36.607 | 0.90 | 1.95375 | 32.3 |
| 39 | 26.862 | 4.06 | | |
| 40 | 48.363 | 9.15 | 1.54814 | 45.8 |
| 41 | −28.327 | 1.00 | 2.00100 | 29.1 |
| 42 | 78.725 | −0.10 | | |
| 43 | 49.073 | 10.57 | 1.49700 | 81.5 |
| 44 | −30.061 | (Variable) | | |
| Image Plane | ∞ | | | |

ASPHERICAL DATA

6th Surface

K = −5.87800e+001　　A4 = −4.11338e−007　　A6 = 2.06301e−010
A8 = −8.94756e−014　　A10 = 2.51858e−017　　A12 = −3.21128e−021

20th Surface

K = 4.38678e+002　　A4 = −4.89448e−006　　A6 = −3.86929e−009
A8 = 7.15676e−011　　A10 = −6.47860e−013　　A12 = 2.11048e−015

25th Surface

K = −5.34393e−001　　A4 = −2.54409e−006　　A6 = 5.8208 1e−010
A8 = 1.79765e−012　　A10 = −6.91154e−015　　A12 = 7.30550e−018

VARIOUS DATA

| ZOOM RATIO | 9.80 Wide-Angle | Middle | Telephoto |
|---|---|---|---|
| Focal length: | 25.50 | 78.17 | 250.00 |
| F-Number: | 2.79 | 2.80 | 3.70 |
| Half Angle of View (°): | 30.13 | 10.72 | 3.39 |
| Image Height: | 14.80 | 14.80 | 14.80 |
| Total Lens Length: | 316.95 | 316.95 | 316.95 |

-continued

| Unit: mm | | | |
|---|---|---|---|
| BF: | 37.94 | 37.94 | 37.94 |
| d13 | 0.99 | 38.85 | 59.24 |
| d20 | 48.23 | 3.58 | 2.77 |
| d23 | 9.62 | 18.81 | 0.97 |
| d29 | 10.71 | 8.31 | 6.56 |
| d44 | 37.94 | 37.94 | 37.94 |

| LENS UNIT DATA | | |
|---|---|---|
| Unit | Starting Surface | Focal length |
| 1 | 1 | 90.20 |
| 2 | 14 | −22.61 |
| 3 | 21 | −82.03 |
| 4 | 24 | 54.87 |
| 5 | 30 | 102.85 |

Numerical Example 2

| Unit: mm | | | | |
|---|---|---|---|---|
| SURFACE DATA | | | | |
| Surface Number | r | d | nd | vd |
| 1 | −175.214 | 3.50 | 1.67300 | 38.3 |
| 2 | 151.202 | 15.58 | | |
| 3 | −119.783 | 3.61 | 1.43387 | 95.1 |
| 4 | −112.613 | 0.20 | | |
| 5 | 227.415 | 13.96 | 1.43387 | 95.1 |
| 6 | −129.184 | 9.38 | | |
| 7 | 162.176 | 8.02 | 1.43387 | 95.1 |
| 8 | −753.576 | 0.08 | | |
| 9 | 125.294 | 8.39 | 1.43387 | 95.1 |
| 10 | −915.044 | 0.83 | | |
| 11 | 74.473 | 8.42 | 1.43875 | 94.7 |
| 12* | 340.725 | (Variable) | | |
| 13 | 269.294 | 1.30 | 2.00069 | 25.5 |
| 14 | 20.440 | 6.36 | | |
| 15 | −39.720 | 1.10 | 1.69680 | 55.5 |
| 16 | 32.336 | 6.99 | 1.85478 | 24.8 |
| 17 | −29.629 | 1.02 | | |
| 18 | −23.763 | 1.10 | 1.72916 | 54.7 |
| 19* | −81.231 | (Variable) | | |
| 20 | −48.638 | 1.30 | 1.88300 | 40.8 |
| 21 | 208.585 | 2.06 | 1.95906 | 17.5 |
| 22 | −213.735 | (Variable) | | |
| 23* | 73.373 | 3.79 | 1.72916 | 54.7 |
| 24 | −49.264 | (Variable) | | |
| 25 (Diaphragm) | ∞ | 6.28 | | |
| 26 | −44.725 | 3.83 | 1.65412 | 39.7 |
| 27 | −19.881 | 1.20 | 1.61800 | 63.3 |
| 28 | 43.010 | 2.37 | | |
| 29 | 33.497 | 1.30 | 1.96300 | 24.1 |
| 30 | 22.812 | 6.38 | 1.65412 | 39.7 |
| 31 | −58.802 | 15.84 | | |
| 32 | 71.434 | 3.35 | 1.95906 | 17.5 |
| 33 | 103.023 | 1.30 | 2.00100 | 29.1 |
| 34 | 28.089 | 1.40 | | |
| 35 | 31.130 | 9.86 | 1.43875 | 94.7 |
| 36 | −22.965 | 1.40 | 2.00100 | 29.1 |
| 37 | −74.760 | 4.89 | 1.49700 | 81.5 |
| 38 | −38.132 | 5.45 | | |
| 39 | −83.722 | 6.77 | 1.59270 | 35.3 |
| 40 | −34.630 | 5.12 | | |
| 41 | 128.652 | 5.93 | 1.49700 | 81.5 |
| 42 | −100.375 | 5.00 | | |

-continued

| Unit: mm | | | | |
|---|---|---|---|---|
| 43 | ∞ | 63.04 | 1.60859 | 46.4 |
| 44 | ∞ | 8.70 | 1.51633 | 64.2 |
| 45 | ∞ | (Variable) | | |
| Image Plane | ∞ | | | |

ASPHERICAL DATA

12th Surface

K = 0.00000e+000    A4 = 8.27789e-008    A6 = -1.49973e-011
A8 = 4.85422e-015   A10 = -5.95615e-019

19th Surface

K = 1.35528e+000    A4 = -6.45504e-006   A6 = -5.00746e-009
A8 = -1.21703e-010  A10 = 4.12728e-012   A12 = -6.25642e-014
A14 = 4.60921e-016  A16 = 1.33684e-018

23rd Surface

K = 1.92930e+000    A4 = -4.90734e-006   A6 = 5.95339e-009
A8 = -1.41239e-010  A10 = 2.19152e-012   A12 = -1.73996e-014
A14 = 6.52571e-017  A16 = -8.36889e-020

VARIOUS DATA

| ZOOM RATIO | 10.00 | | |
|---|---|---|---|
| | Wide-Angle | Middle | Telephoto |
| Focal length: | 14.00 | 43.48 | 140.00 |
| F-Number: | 2.90 | 2.90 | 2.90 |
| Half Angle of View (°): | 33.45 | 12.01 | 3.78 |
| Image Height: | 9.25 | 9.25 | 9.25 |
| Total Lens Length: | 334.12 | 334.12 | 334.12 |
| BF: | 16.63 | 16.63 | 16.63 |
| d12 | 1.50 | 38.69 | 58.72 |
| d19 | 57.19 | 10.12 | 0.63 |
| d22 | 0.99 | 10.68 | 0.97 |
| d24 | 1.39 | 1.58 | 0.74 |
| d45 | 16.63 | 16.63 | 16.63 |

LENS UNIT DATA

| Unit | Starting Surface | Focal length |
|---|---|---|
| 1 | 1 | 77.73 |
| 2 | 13 | -19.98 |
| 3 | 20 | -75.96 |
| 4 | 23 | 40.78 |
| 5 | 25 | 59.39 |

Numerical Example 3

| Unit: mm | | | | |
|---|---|---|---|---|
| SURFACE DATA | | | | |
| Surface Number | r | d | nd | vd |
| 1 | -171.783 | 2.30 | 1.80100 | 35.0 |
| 2 | 360.342 | 3.32 | | |
| 3 | 2449.824 | 2.30 | 1.80100 | 35.0 |
| 4 | 93.547 | 17.69 | 1.49700 | 81.5 |
| 5 | -127.730 | 0.40 | | |
| 6 | 164.755 | 8.90 | 1.43387 | 95.1 |
| 7 | -323.842 | 6.90 | | |
| 8 | 119.088 | 10.53 | 1.61800 | 63.3 |
| 9 | -260.350 | 0.15 | | |
| 10 | 65.966 | 5.53 | 1.77250 | 49.6 |
| 11 | 113.238 | (Variable) | | |
| 12 | 108.681 | 2.33 | 1.77250 | 49.6 |
| 13 | 149.799 | (Variable) | | |
| 14 | 67.372 | 0.90 | 1.88300 | 40.8 |
| 15 | 14.158 | 6.41 | | |
| 16 | -64.571 | 7.14 | 1.80810 | 22.8 |
| 17 | -13.488 | 0.70 | 1.88300 | 40.8 |
| 18 | 76.051 | 0.20 | | |
| 19 | 26.817 | 2.89 | 1.66680 | 33.0 |
| 20 | 63.291 | (Variable) | | |
| 21 | -43.870 | 0.75 | 1.77250 | 49.6 |
| 22 | 30.844 | 3.77 | 1.69895 | 30.1 |
| 23 | -80.916 | 2.22 | | |
| 24 | -28.353 | 0.75 | 1.77250 | 49.6 |
| 25 | -60.179 | (Variable) | | |
| 26 | -122.743 | 3.62 | 1.63854 | 55.4 |
| 27 | -33.339 | 0.15 | | |
| 28 | -178.655 | 2.66 | 1.51633 | 64.1 |
| 29 | -58.384 | (Variable) | | |
| 30 (Diaphragm) | ∞ | 1.30 | | |
| 31 | 84.875 | 6.24 | 1.51742 | 52.4 |
| 32 | -30.166 | 0.90 | 1.83481 | 42.7 |
| 33 | -88.784 | 32.40 | | |
| 34 | 82.335 | 5.14 | 1.49700 | 81.5 |
| 35 | -52.958 | 9.14 | | |

-continued

Unit: mm

| | | | | |
|---|---|---|---|---|
| 36 | −451.214 | 1.40 | 1.83403 | 37.2 |
| 37 | 24.017 | 5.09 | 1.48749 | 70.2 |
| 38 | 137.787 | 0.36 | | |
| 39 | 64.625 | 7.10 | 1.50127 | 56.5 |
| 40 | −22.356 | 1.40 | 1.83481 | 42.7 |
| 41 | −69.828 | 3.34 | | |
| 42 | 71.892 | 5.20 | 1.48749 | 70.2 |
| 43 | −44.146 | 0.50 | | |
| 44 | −86.855 | 2.10 | 1.49700 | 81.5 |
| 45 | −64.323 | 4.00 | | |
| 46 | ∞ | 33.00 | 1.60859 | 46.4 |
| 47 | ∞ | 13.20 | 1.51633 | 64.1 |
| 48 | ∞ | (Variable) | | |
| Image Plane | ∞ | | | |

VARIOUS DATA

| | 20.00 | | |
|---|---|---|---|
| ZOOM RATIO | Wide-Angle | Middle | Telephoto |
| Focal length: | 8.00 | 35.00 | 160.00 |
| F-Number: | 1.90 | 1.90 | 2.80 |
| Half Angle of View (°): | 34.51 | 8.76 | 1.97 |
| Image Height: | 5.50 | 5.50 | 5.50 |
| Total Lens Length: | 295.50 | 295.50 | 295.50 |
| BF: | 7.50 | 7.50 | 7.50 |
| d11 | 0.83 | 26.24 | 37.12 |
| d13 | 0.80 | 12.02 | 16.83 |
| d20 | 54.59 | 8.56 | 7.32 |
| d25 | 6.51 | 11.46 | 1.47 |
| d29 | 0.99 | 5.45 | 0.98 |
| d48 | 7.50 | 7.50 | 7.50 |

LENS UNIT DATA

| Unit | Starting Surface | Focal length |
|---|---|---|
| 1 | 1 | 71.25 |
| 2 | 12 | 500.20 |
| 3 | 14 | −14.23 |
| 4 | 21 | −38.15 |
| 5 | 26 | 49.99 |
| 6 | 30 | 57.02 |

Numerical Example 4

Unit: mm

SURFACE DATA

| Surface Number | r | d | nd | vd |
|---|---|---|---|---|
| 1 | −161.563 | 2.20 | 1.74951 | 35.3 |
| 2 | 83.531 | 1.54 | | |
| 3 | 89.927 | 6.77 | 1.43387 | 95.1 |
| 4 | 183.771 | 0.20 | | |
| 5 | 135.868 | 15.24 | 1.43387 | 95.1 |
| 6 | −95.350 | 7.88 | | |
| 7 | 136.897 | 6.93 | 1.43387 | 95.1 |
| 8 | −454.092 | 0.15 | | |
| 9 | 91.750 | 8.76 | 1.43387 | 95.1 |

-continued

Unit: mm

| | | | | |
|---|---|---|---|---|
| 10 | −283.987 | 0.15 | | |
| 11 | 53.445 | 4.48 | 1.76385 | 48.5 |
| 12 | 88.487 | (Variable) | | |
| 13 | 70.773 | 0.90 | 1.88300 | 40.8 |
| 14 | 13.760 | 5.02 | | |
| 15 | −66.538 | 6.70 | 1.80810 | 22.8 |
| 16 | −12.185 | 0.70 | 1.88300 | 40.8 |
| 17 | 52.502 | 0.20 | | |
| 18 | 24.812 | 2.78 | 1.62588 | 35.7 |
| 19 | 88.435 | (Variable) | | |
| 20 | −26.441 | 0.70 | 1.83400 | 37.2 |
| 21 | 27.074 | 3.42 | 1.84649 | 23.9 |
| 22 | −190.460 | (Variable) | | |
| 23 (Diaphragm) | ∞ | 1.96 | | |
| 24 | −83.419 | 3.00 | 1.63854 | 55.4 |
| 25 | −32.030 | 0.15 | | |
| 26 | 11679.132 | 2.19 | 1.51823 | 58.9 |
| 27 | −115.244 | 0.07 | | |
| 28 | 68.450 | 5.93 | 1.51742 | 52.4 |
| 29 | −31.378 | 0.90 | 1.74951 | 35.3 |
| 30 | −76.848 | (Variable) | | |
| 31 | 274.509 | 2.76 | 1.49700 | 81.5 |
| 32 | −96.339 | 6.26 | | |
| 33 | 60.490 | 1.40 | 1.80100 | 35.0 |
| 34 | 22.542 | 5.43 | 1.48749 | 70.2 |
| 35 | 76.507 | 0.11 | | |
| 36 | 59.172 | 7.71 | 1.50127 | 56.5 |
| 37 | −23.847 | 1.40 | 1.83481 | 42.7 |
| 38 | −96.461 | 0.15 | | |
| 39 | 100.150 | 5.98 | 1.43875 | 94.7 |
| 40 | −32.303 | 4.00 | | |
| 41 | ∞ | 33.00 | 1.60859 | 46.4 |
| 42 | ∞ | 13.20 | 1.51633 | 64.1 |
| 43 | ∞ | (Variable) | | |
| Image Plane | ∞ | | | |

VARIOUS DATA

| | 17.00 | | |
|---|---|---|---|
| ZOOM RATIO | Wide-Angle | Middle | Telephoto |
| Focal length: | 8.00 | 32.65 | 136.00 |
| F-Number: | 1.90 | 1.90 | 2.50 |
| Half Angle of View (°): | 34.51 | 9.56 | 2.32 |
| Image Height: | 5.50 | 5.50 | 5.50 |
| Total Lens Length: | 271.31 | 271.31 | 271.31 |
| BF: | 7.64 | 7.64 | 7.64 |
| d12 | 0.79 | 32.80 | 47.01 |
| d19 | 45.91 | 9.49 | 12.81 |
| d22 | 6.27 | 10.96 | 1.15 |
| d30 | 40.35 | 40.09 | 32.36 |
| d43 | 7.64 | 7.64 | 7.64 |

LENS UNIT DATA

| Unit | Starting Surface | Focal length |
|---|---|---|
| 1 | 1 | 61.00 |
| 2 | 13 | −13.50 |
| 3 | 20 | −37.99 |
| 4 | 23 | 37.71 |
| 5 | 31 | 52.42 |

Numerical Example 5

Unit: mm

SURFACE DATA

| Surface Number | r | d | nd | vd |
|---|---|---|---|---|
| 1* | 78.953 | 2.80 | 1.77250 | 49.6 |
| 2 | 42.025 | 21.29 | | |

-continued

| Unit: mm | | | | |
|---|---|---|---|---|
| 3 | 68.913 | 2.20 | 1.77250 | 49.6 |
| 4 | 44.989 | 20.10 | | |
| 5 | 353.478 | 2.20 | 1.77250 | 49.6 |
| 6 | 102.861 | 4.67 | 1.92286 | 18.9 |
| 7 | 143.293 | 10.00 | | |
| 8 | 143.296 | 8.54 | 1.49700 | 81.5 |
| 9* | −660.058 | 10.16 | | |
| 10 | 126.072 | 12.33 | 1.61800 | 63.3 |
| 11 | −89.566 | 2.02 | | |
| 12 | −385.544 | 2.00 | 1.80518 | 25.4 |
| 13 | 67.762 | 3.01 | 1.49700 | 81.5 |
| 14 | 66.178 | 4.38 | | |
| 15 | 93.903 | 10.00 | 1.59522 | 67.7 |
| 16 | −116.798 | 0.20 | | |
| 17 | 79.466 | 7.23 | 1.73000 | 49.0 |
| 18 | −204.448 | (Variable) | | |
| 19* | 1243.240 | 1.30 | 1.77250 | 49.6 |
| 20 | 23.783 | 10.00 | | |
| 21 | −42.047 | 0.90 | 1.77250 | 49.6 |
| 22 | 29.864 | 4.04 | 1.84666 | 23.8 |
| 23 | −71.594 | 2.91 | | |
| 24 | −18.875 | 0.90 | 1.80100 | 35.0 |
| 25 | −26.589 | (Variable) | | |
| 26 | −33.939 | 0.90 | 1.72916 | 54.7 |
| 27 | 54.755 | 2.93 | 1.84666 | 23.8 |
| 28 | 1294.668 | (Variable) | | |
| 29 (Diaphragm) | ∞ | 1.85 | | |
| 30 | 700.247 | 4.17 | 1.81600 | 46.6 |
| 31 | −56.385 | 0.20 | | |
| 32 | 320.448 | 3.94 | 1.51742 | 52.4 |
| 33 | −53.596 | (Variable) | | |
| 34 | 53.543 | 8.45 | 1.48749 | 70.2 |
| 35 | −35.854 | 1.20 | 2.00069 | 25.5 |
| 36 | −224.787 | 0.20 | | |
| 37 | 28.978 | 3.77 | 1.53172 | 48.8 |
| 38 | 35.232 | 20.70 | | |
| 39 | 265.405 | 6.25 | 1.51823 | 58.9 |
| 40 | −64.862 | 14.34 | | |
| 41 | 109.038 | 8.83 | 1.49700 | 81.5 |
| 42 | −21.348 | 0.85 | 1.95375 | 32.3 |
| 43 | −120.445 | 2.16 | | |
| 44 | 1741.197 | 6.19 | 1.92286 | 18.9 |
| 45 | −34.707 | 0.85 | 2.00100 | 29.1 |
| 46 | 100.346 | 1.04 | | |
| 47 | 49.126 | 6.84 | 1.49700 | 81.5 |
| 48 | −56.043 | (Variable) | | |
| Image Plane | ∞ | | | |

ASPHERICAL DATA

1st Surface

K = 6.16535e−001   A4 = 9.53347e−008   A6 = 2.00290e−011
A8 = −3.07226e−015

9th Surface

K = −8.09015e+002   A4 = 7.34432e−007   A6 = 1.86751e−010
A8 = −1.44173e−013

19th Surface

K = −1.93517e+004   A4 = 8.47692e−006   A6 = −7.51813e−009
A8 = 2.17579e−011

VARIOUS DATA

| | 4.50 | | |
|---|---|---|---|
| ZOOM RATIO | Wide-Angle | Middle | Telephoto |
| Focal length: | 16.00 | 33.31 | 71.93 |
| F-Number: | 2.99 | 3.00 | 3.00 |
| Half Angle of View (°): | 44.18 | 25.03 | 12.20 |
| Image Height: | 15.55 | 15.55 | 15.55 |
| Total Lens Length: | 320.01 | 320.01 | 320.01 |
| BF: | 39.96 | 39.96 | 39.96 |
| d18 | 1.00 | 17.78 | 30.19 |
| d25 | 29.70 | 7.90 | 2.00 |
| d28 | 2.74 | 5.44 | 1.24 |

| Unit: mm | | | |
|---|---|---|---|
| d33 | 7.77 | 10.08 | 7.77 |
| d48 | 39.96 | 39.96 | 39.96 |

| LENS UNIT DATA | | |
|---|---|---|
| Unit | Starting Surface | Focal length |
| 1 | 1 | 32.00 |
| 2 | 19 | −18.80 |
| 3 | 26 | −50.00 |
| 4 | 29 | 37.74 |
| 5 | 34 | 95.79 |

Numerical Example 6

| Unit: mm | | | | |
|---|---|---|---|---|
| SURFACE DATA | | | | |
| Surface Number | r | d | nd | vd |
| 1 | 234.095 | 7.49 | 1.43387 | 95.1 |
| 2 | 744.347 | 1.00 | | |
| 3 | 611.406 | 3.00 | 1.80100 | 35.0 |
| 4 | 179.646 | 1.07 | | |
| 5 | 180.854 | 14.73 | 1.43387 | 95.1 |
| 6 | −616.575 | 11.15 | | |
| 7 | 206.490 | 7.85 | 1.43387 | 95.1 |
| 8 | 1434.650 | 0.20 | | |
| 9 | 143.338 | 5.46 | 1.43387 | 95.1 |
| 10 | 229.576 | 0.20 | | |
| 11 | 118.792 | 8.23 | 1.43387 | 95.1 |
| 12 | 293.076 | (Variable) | | |
| 13 | 157.514 | 1.00 | 1.83400 | 37.2 |
| 14 | 27.285 | 8.17 | | |
| 15 | −53.185 | 0.90 | 1.77250 | 49.6 |
| 16 | 48.123 | 0.70 | | |
| 17 | 39.025 | 7.61 | 1.80810 | 22.8 |
| 18 | −58.658 | (Variable) | | |
| 19 | −36.219 | 1.10 | 1.77250 | 49.6 |
| 20 | −16640.477 | (Variable) | | |
| 21 | −62.809 | 1.30 | 1.71300 | 53.9 |
| 22 | 37.542 | 3.41 | 1.83400 | 37.2 |
| 23 | 123.493 | (Variable) | | |
| 24 | 622.004 | 3.95 | 1.74951 | 35.3 |
| 25 | −65.214 | 1.00 | | |
| 26 | −78.813 | 1.53 | 1.51823 | 58.9 |
| 27 | −74.268 | (Variable) | | |
| 28 (Diaphragm) | ∞ | 1.00 | | |
| 29 | 91.777 | 9.43 | 1.74951 | 35.3 |
| 30 | −37.804 | 1.50 | 2.00100 | 29.1 |
| 31 | 174.214 | 1.00 | | |
| 32 | 84.520 | 8.31 | 1.48749 | 70.2 |
| 33 | −39.356 | 1.50 | 1.88300 | 40.8 |
| 34 | −60.994 | 50.00 | | |
| 35 | 163.915 | 4.64 | 1.51742 | 52.4 |
| 36 | −55.320 | 2.54 | | |
| 37 | 36.082 | 1.20 | 1.78590 | 44.2 |
| 38 | 15.322 | 6.50 | 1.51742 | 52.4 |
| 39 | 69.483 | 2.01 | | |
| 40 | 100.129 | 5.44 | 1.54814 | 45.8 |
| 41 | −2364.899 | 1.20 | 1.77250 | 49.6 |
| 42 | 29.077 | 0.67 | | |
| 43 | 20.807 | 4.04 | 1.49700 | 81.5 |
| 44 | 614.656 | 3.80 | | |
| 45 | ∞ | 34.37 | 1.60859 | 46.4 |
| 46 | ∞ | 13.75 | 1.51680 | 64.2 |
| 47 | ∞ | (Variable) | | |
| Image Plane | ∞ | | | |

| VARIOUS DATA | | | |
|---|---|---|---|
| ZOOM RATIO | 40.00 | | |
| | Wide-Angle | Middle | Telephoto |
| Focal length: | 11.00 | 218.22 | 440.00 |
| F-Number: | 2.10 | 2.10 | 4.10 |
| Half Angle of View (°): | 26.57 | 1.44 | 0.72 |
| Image Height: | 5.50 | 5.50 | 5.50 |
| Total Lens Length: | 402.14 | 402.14 | 402.14 |
| BF: | 7.90 | 7.90 | 7.90 |
| d12 | 10.00 | 108.86 | 113.65 |
| d18 | 1.43 | 6.19 | 11.14 |
| d20 | 125.30 | 2.96 | 22.17 |
| d23 | 10.04 | 17.80 | 2.30 |
| d27 | 3.50 | 14.46 | 1.00 |
| d47 | 7.90 | 7.90 | 7.90 |

| LENS UNIT DATA | | |
|---|---|---|
| Unit | Starting Surface | Focal length |
| 1 | 1 | 161.84 |
| 2 | 13 | −60.64 |
| 3 | 19 | −46.99 |
| 4 | 21 | −66.60 |
| 5 | 24 | 76.81 |
| 6 | 28 | 70.45 |

Numerical Example 7

| Unit: mm | | | | |
|---|---|---|---|---|
| SURFACE DATA | | | | |
| Surface Number | r | d | nd | vd |
| 1* | 1192.402 | 2.50 | 1.83481 | 42.7 |
| 2 | 30.426 | 16.96 | | |
| 3* | 137.578 | 2.00 | 1.83481 | 42.7 |
| 4 | 78.229 | 10.11 | | |

-continued

| | | Unit: mm | | |
|---|---|---|---|---|
| 5 | −100.411 | 1.80 | 1.83481 | 42.7 |
| 6 | −481.398 | 0.15 | | |
| 7 | 93.872 | 3.85 | 1.92286 | 18.9 |
| 8 | 257.624 | 2.21 | | |
| 9 | 179.156 | 7.63 | 1.60300 | 65.4 |
| 10* | −106.058 | 4.41 | | |
| 11 | 4935.437 | 8.72 | 1.43387 | 95.1 |
| 12 | −55.764 | 0.65 | | |
| 13 | −57.428 | 1.70 | 1.80000 | 29.8 |
| 14 | −104.843 | 0.18 | | |
| 15 | 173.505 | 1.70 | 1.91650 | 31.6 |
| 16 | 56.124 | 12.67 | 1.43875 | 94.7 |
| 17 | −148.337 | 0.40 | | |
| 18 | 4271.888 | 9.14 | 1.43387 | 95.1 |
| 19 | −62.811 | 0.40 | | |
| 20 | 143.432 | 7.53 | 1.76385 | 48.5 |
| 21 | −146.520 | (Variable) | | |
| 22 | 106.192 | 0.70 | 2.00100 | 29.1 |
| 23 | 18.267 | 4.25 | | |
| 24 | −54.292 | 0.70 | 1.43875 | 94.7 |
| 25 | 89.426 | 2.07 | | |
| 26 | −193.060 | 5.57 | 1.85478 | 24.8 |
| 27 | −15.511 | 0.70 | 1.88300 | 40.8 |
| 28 | 140.345 | 0.21 | | |
| 29 | 39.231 | 2.87 | 1.64769 | 33.8 |
| 30 | −209.632 | (Variable) | | |
| 31 | −34.647 | 0.80 | 1.72916 | 54.7 |
| 32 | 49.836 | 2.41 | 1.84666 | 23.8 |
| 33 | 4117.439 | (Variable) | | |
| 34* | 59.371 | 6.11 | 1.58913 | 61.1 |
| 35 | −59.288 | (Variable) | | |
| 36 (Diaphragm) | ∞ | 2.45 | | |
| 37 | 196.135 | 4.72 | 1.51742 | 52.4 |
| 38 | −47.588 | 1.00 | 1.83481 | 42.7 |
| 39 | −156.750 | 35.50 | | |
| 40 | 62.539 | 5.60 | 1.63980 | 34.5 |
| 41 | −48.447 | 1.79 | | |
| 42 | −70.201 | 0.90 | 1.88300 | 40.8 |
| 43 | 29.203 | 5.31 | 1.48749 | 70.2 |
| 44 | −106.840 | 0.20 | | |
| 45 | 64.763 | 7.66 | 1.43875 | 94.7 |
| 46 | −21.285 | 0.90 | 2.00100 | 29.1 |
| 47 | −59.870 | 0.13 | | |
| 48 | 175.318 | 4.80 | 1.61800 | 63.3 |
| 49 | −35.144 | 4.00 | | |
| 50 | ∞ | 33.00 | 1.60859 | 46.4 |
| 51 | ∞ | 13.20 | 1.51680 | 64.2 |
| 52 | ∞ | (Variable) | | |
| Image Plane | ∞ | | | |

ASPHERICAL DATA

1st Surface

| K = 0.00000e+000 | A4 = 4.79471e−006 | A6 = 1.09101e−008 |
|---|---|---|
| A8 = 7.85275e−012 | A10 = 9.49250e−014 | A12 = 1.11174e−016 |
| A14 = 1.85317e−020 | A16 = −6.47635e−026 | A3 = 6.81313e−006 |
| A5 = −1.91840e−007 | A7 = −3.04740e−010 | A9 = −1.17561e−012 |
| A11 = −4.11498e−015 | A13 = −1.90019e−018 | A15 = −7.32675e−023 |

3rd Surface

| K = 0.00000e+000 | A4 = −2.88353e−006 | A6 = −7.32735e−008 |
|---|---|---|
| A8 = −7.11623e−010 | A10 = −3.23231e−013 | A12 = 1.59758e−015 |
| A14 = −6.51939e−019 | A16 = −2.03836e−022 | A3 = −5.37483e−006 |
| A5 = 4.33123e−007 | A7 = 9.09152e−009 | A9 = 3.03607e−011 |
| A11 = −3.27297e−014 | A13 = −1.78387e−017 | A15 = 2.23171e−020 |

10th Surface

| K = 0.00000e+000 | A4 = 1.24811e−006 | A6 = 1.37302e−008 |
|---|---|---|
| A8 = 2.71930e−010 | A10 = 2.08643e−013 | A12 = −7.68000e−016 |
| A14 = 1.05314e−018 | A16 = 2.19108e−022 | A3 = −1.60560e−006 |
| A5 = −1.67398e−008 | A7 = −2.65872e−009 | A9 = −1.44572e−011 |
| A11 = 1.68256e−014 | A13 = −4.85868e−018 | A15 = −2.64140e−020 |

-continued

Unit: mm

34th Surface

K = −8.55475e+000   A4 = 1.00844e−006   A6 = −2.95364e−009
A8 = 1.16661e−012

VARIOUS DATA

| ZOOM RATIO | 13.33 Wide-Angle | Middle | Telephoto |
|---|---|---|---|
| Focal length: | 4.50 | 16.51 | 59.99 |
| F-Number: | 1.90 | 1.90 | 2.80 |
| Half Angle of View (°): | 50.71 | 18.43 | 5.24 |
| Image Height: | 5.50 | 5.50 | 5.50 |
| Total Lens Length: | 315.65 | 315.65 | 315.65 |
| BF: | 7.45 | 7.45 | 7.45 |
| d21 | 0.65 | 37.62 | 53.47 |
| d30 | 42.42 | 5.41 | 4.56 |
| d33 | 15.45 | 18.86 | 2.11 |
| d35 | 7.42 | 4.05 | 5.80 |
| d52 | 7.45 | 7.45 | 7.45 |

LENS UNIT DATA

| Unit | Starting Surface | Focal length |
|---|---|---|
| 1 | 1 | 30.38 |
| 2 | 22 | −20.82 |
| 3 | 31 | −53.01 |
| 4 | 34 | 51.14 |
| 5 | 36 | 52.07 |

TABLE 1

| Ineq. No. | Inequality | Example 1 | 2 | 3 | 4 | 5 | 6 | 7 |
|---|---|---|---|---|---|---|---|---|
| (1) (4) | vdp | 81.54 | 81.54 | 81.54 | 94.66 | 81.54 | 81.54 | 63.33 |
| (2) | Ndp + 0.01vdp | 2.31 | 2.31 | 2.31 | 2.39 | 2.31 | 2.31 | 2.25 |
| (3) | Z | 9.80 | 10.00 | 20.00 | 17.00 | 4.50 | 40.00 | 13.33 |
| (5) | |fp/fv| | 1.74 | 5.71 | 34.01 | 4.18 | 2.86 | 0.92 | 2.29 |
| (6) | Le/fw | 3.86 | 5.46 | 10.04 | 3.90 | 5.10 | 9.09 | 15.22 |

Image Pickup Apparatus

Figure 15:
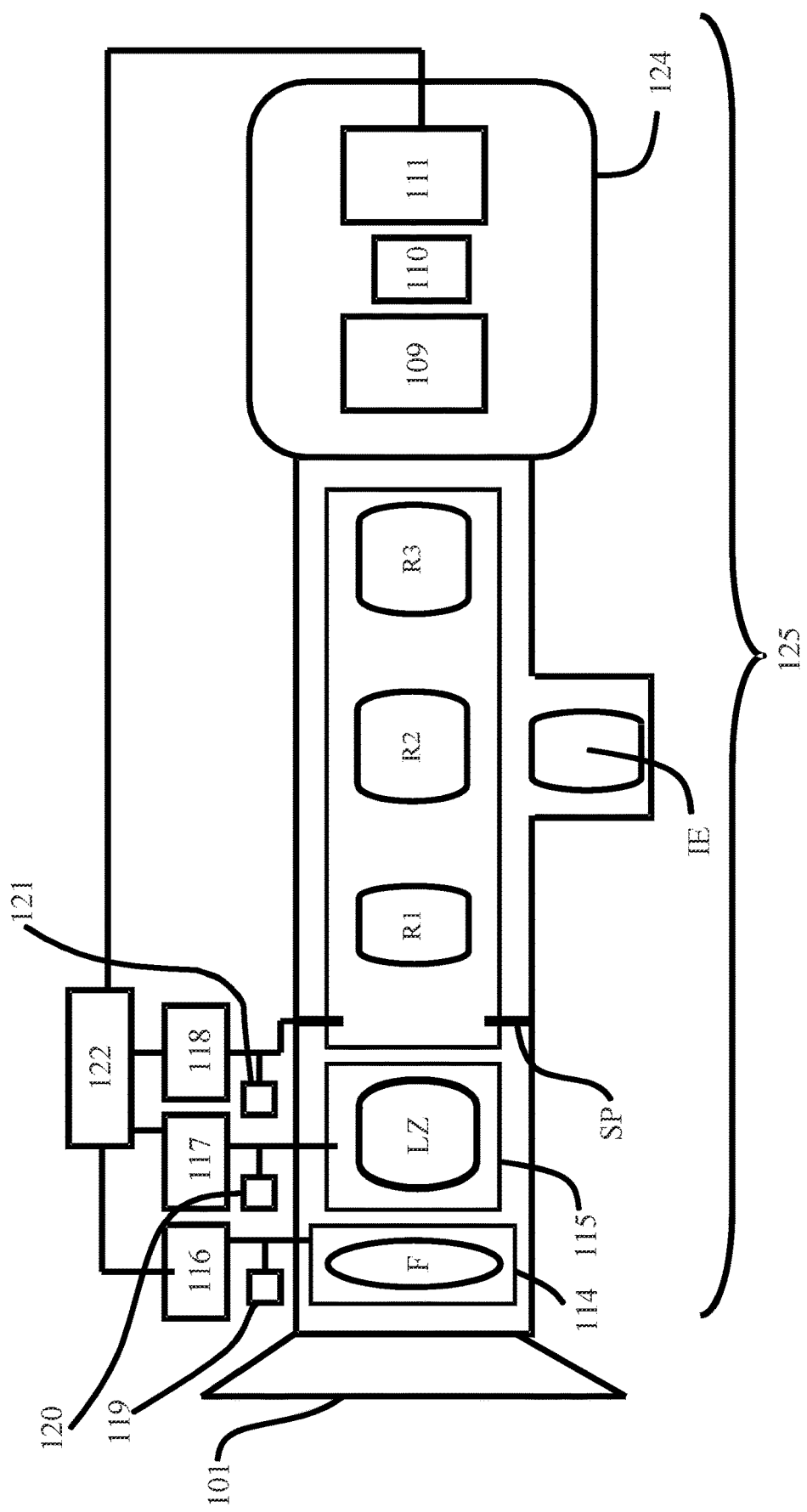
FIG. 15 is a diagram illustrating an image pickup apparatus having the zoom lens according to any one of Examples 1 to 7.

FIG. 15 illustrates a configuration of a camera system (image pickup apparatus) 125 that uses, as an image pickup optical system, the zoom lens according to any one of Examples 1 to 7. A reference numeral 101 denotes the zoom lens according to any one of Examples 1 to 7. A reference numeral 124 denotes a camera, and the zoom lens 101 is an interchangeable lens that is attachable to and detachable from the camera 124.

The zoom lens 101 includes a first lens unit F, a zooming unit LZ that moves during zooming, and imaging lens units R1 to R3. The first lens unit F includes a movable sub unit that moves during focusing. The zooming unit LZ includes at least three lens units each of which moves during zooming. An aperture diaphragm SP and the imaging lens units R1 to R3 are disposed on the image side of the zooming unit LZ. A lens unit IE, which is an extender or the like, is inserted between any two lens units of the imaging lens units R1 to R3 (for example, between lens units R1 and R2) from the outside of the optical path.

Reference numerals 114 and 115 denote driving mechanisms including, for example, a helicoid, a cam, and the like, that respectively drive the movable sub unit in the first lens unit F and the movable lens units in the zooming unit LZ in the optical axis direction. Reference numerals 116, 117, and 118 are actuators that electrically drive the driving mechanisms 114 and 115 and the aperture diaphragm SP.

Reference numerals 119, 120, and 121 denote detectors such as encoder, potentiometers, and photosensors, for detecting positions on the optical axis of the movable sub unit in the first lens unit F and the movable lens units in the zooming unit LZ and an aperture diameter of the aperture diaphragm SP.

In the camera 124, a reference numeral 109 denotes a glass block corresponding to an optical filter or a color separation optical system, and a reference numeral 110 denotes an image sensor (image pickup element or photoelectric conversion element), such as a CCD sensor and a CMOS sensor, that captures (configured to pick up) an optical image (object image) of an object formed by the zoom lens 101.

Reference numerals 111 and 122 denote CPUs as controllers that control the driving of the camera 124 and the zoom lens 101.

When the zoom lens according to any one of Examples 1 to 7 is used as the image pickup optical system of the camera system 125, it is possible to realize high imaging performance from an optical aspect.

According to the above examples, it is possible to provide, for example, a zoom lens that is beneficial to size reduction, a wide angle of view, a high zoom ratio, a large diameter ratio, and high optical performance.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-131582, filed on Aug. 12, 2021, which is hereby incorporated by reference herein in its entirety.

What is claimed is:

1. A zoom lens comprising, in order from an object side to an image side:
   a first lens unit having a positive refractive power and configured not to move for zooming;
   at least three movable lens units configured to move so that a distance between each pair of adjacent lens units therein changes for zooming; and
   a final lens unit disposed closest to the image side in lens units included in the zoom lens, having a positive refractive power, and configured not to move for zooming,
   wherein a movable lens unit closest to the image side in the at least three movable lens units has a positive refractive power, and a movable lens unit second closest to the image side in the at least three movable lens units has a negative refractive power,
   wherein the first lens unit includes:
      a first sub unit closest to the object side and configured not to move for focusing; and
      a second sub unit configured to move for focusing,
   wherein the final lens unit includes a positive lens closest to the image side in elements having a refractive power in the final lens unit, and
   wherein following inequalities are satisfied:

$80 \leq vdp \leq 81.54$, $2.24 \leq Ndp + 0.01 vdp$, $4 \leq Z \leq 50$, and $2.5 \leq Le/fw \leq 5.46$ where vdp represents an Abbe number with respect to a d-line of the positive lens, Ndp represents a refractive index with respect to the d-line of the positive lens, Z represents a zoom ratio of the zoom lens, Le represents a distance on an optical axis from a lens surface closest to the object side in the final lens unit to an image side surface of the positive lens in the final lens unit, and fw represents a focal length of the zoom lens at a wide-angle end.

2. The zoom lens according to claim 1, wherein the final lens unit includes four or more lenses each of which has a refractive power.

3. The zoom lens according to claim 1, wherein a following inequality is satisfied:

$0.5 \leq |fp/fv| \leq 50.0$ where fp represents a focal length of the positive lens, and fv represents a focal length of a movable lens unit having a strongest negative refractive power in the at least three movable lens units.

4. The zoom lens according to claim 1, wherein a movable lens unit having a strongest negative refractive power in the at least three movable lens units includes two negative lenses and one positive lens.

5. The zoom lens according to claim 1, wherein the first lens unit includes a positive lens at a position closest to the image side in the first lens unit.

6. The zoom lens according to claim 1, wherein a movable lens unit having a strongest negative refractive power in the at least three movable lens units moves to the image side for zooming from a wide-angle end to a telephoto end.

7. The zoom lens according to claim 1, wherein the zoom lens includes, as the at least three movable lens units, in order from the object side to the image side:
   a second lens unit having a negative refractive power;
   a third lens unit having a negative refractive power; and
   a fourth lens unit having a positive refractive power, and
   wherein the zoom lens includes, as the final lens unit, a fifth lens unit having a positive refractive power.

8. The zoom lens according to claim 1, wherein the zoom lens includes, as the at least three movable lens units, in order from the object side to the image side:
   a second lens unit having a positive or negative refractive power;
   a third lens unit having a negative refractive power;
   a fourth lens unit having a negative refractive power; and
   a fifth lens unit having a positive refractive power,
   wherein the zoom lens includes, as the final lens unit, a sixth lens unit having a positive refractive power.

9. An apparatus comprising:
   a zoom lens; and
   a pickup element configured to pick up an image formed by the zoom lens,
   wherein the zoom lens includes, in order from an object side to an image side:
   a first lens unit having a positive refractive power and configured not to move for zooming;
   at least three movable lens units configured to move so that a distance between each pair of adjacent lens units therein changes for zooming; and
   a final lens unit disposed closest to the image side in lens units included in the zoom lens, having a positive refractive power, and configured not to move for zooming,
   wherein a movable lens unit closest to the image side in the at least three movable lens units has a positive refractive power, and a movable lens unit second closest to the image side in the at least three movable lens units has a negative refractive power,
   wherein the first lens unit includes:
      a first sub unit closest to the object side and configured not to move for focusing; and
      a second sub unit configured to move for focusing,
   wherein the final lens unit includes a positive lens closest to the image side in elements having a refractive power in the final lens unit,
   wherein following inequalities are satisfied:

$80 \leq vdp \leq 81.54$, $2.24 \leq Ndp + 0.01 vdp$, $4 \leq Z \leq 50$, and $2.5 \leq Le/fw \leq 5.46$ where vdp represents an Abbe number with respect to a d-line of the positive lens, Ndp represents a refractive index with respect to the d-line of the positive lens, Z represents a zoom ratio of the zoom lens, Le represents a distance on an optical axis from a lens surface closest to the object side in the final lens unit to an image side surface of the positive lens in the final lens unit, and fw represents a focal length of the zoom lens at a wide-angle end.

10. The apparatus according to claim 9, wherein the final lens unit includes four or more lenses each of which has a refractive power.

11. The apparatus according to claim 9, wherein a following inequality is satisfied:

$0.5 \leq |fp/fv| \leq 50.0$ where fp represents a focal length of the positive lens, and fv represents a focal length of a movable lens unit having a strongest negative refractive power in the at least three movable lens units.

12. The apparatus according to claim 9, wherein a movable lens unit having a strongest negative refractive power in the at least three movable lens units includes two negative lenses and one positive lens.

13. The apparatus according to claim 9, wherein the first lens unit includes a positive lens at a position closest to the image side in the first lens unit.

14. The apparatus according to claim 9, wherein a movable lens unit having a strongest negative refractive power in the at least three movable lens units moves to the image side for zooming from a wide-angle end to a telephoto end.

15. The apparatus according to claim 9, wherein the zoom lens includes, as the at least three movable lens units, in order from the object side to the image side:
a second lens unit having a negative refractive power;
a third lens unit having a negative refractive power; and
a fourth lens unit having a positive refractive power, and
wherein the zoom lens includes, as the final lens unit, a fifth lens unit having a positive refractive power.

16. The apparatus according to claim 9, wherein the zoom lens includes, as the at least three movable lens units, in order from the object side to the image side:
a second lens unit having a positive or negative refractive power;
a third lens unit having a negative refractive power;
a fourth lens unit having a negative refractive power; and
a fifth lens unit having a positive refractive power,
wherein the zoom lens includes, as the final lens unit, a sixth lens unit having a positive refractive power.

17. A zoom lens comprising, in order from an object side to an image side:
a first lens unit having a positive refractive power and configured not to move for zooming;
at least three movable lens units configured to move so that a distance between each pair of adjacent lens units therein changes for zooming; and
a final lens unit disposed closest to the image side in lens units included in the zoom lens, having a positive refractive power, and configured not to move for zooming,
wherein a movable lens unit closest to the image side in the at least three movable lens units has a positive refractive power, and a movable lens unit second closest to the image side in the at least three movable lens units has a negative refractive power,
wherein a movable lens unit having a strongest negative refractive power in the at least three movable lens units includes two negative lenses and one positive lens,
wherein the first lens unit includes:
a first sub unit closest to the object side and configured not to move for focusing; and
a second sub unit configured to move for focusing,
wherein the final lens unit includes a positive lens closest to the image side in elements having a refractive power in the final lens unit, and
wherein following inequalities are satisfied:

$62 \leq vdp \leq 81.54$, $2.24 \leq Ndp + 0.01 vdp$, $4 \leq Z \leq 50$, and $2.5 \leq Le/fw \leq 5.46$ where vdp represents an Abbe number with respect to a d-line of the positive lens, Ndp represents a refractive index with respect to the d-line of the positive lens, Z represents a zoom ratio of the zoom lens, Le represents a distance on an optical axis from a lens surface closest to the object side in the final lens unit to an image side surface of the positive lens in the final lens unit, and fw represents a focal length of the zoom lens at a wide-angle end.

18. An apparatus comprising:
a zoom lens; and
a pickup element configured to pick up an image formed by the zoom lens,
wherein the zoom lens includes, in order from an object side to an image side:
a first lens unit having a positive refractive power and configured not to move for zooming;
at least three movable lens units configured to move so that a distance between each pair of adjacent lens units therein changes for zooming; and
a final lens unit disposed closest to the image side in lens units included in the zoom lens, having a positive refractive power, and configured not to move for zooming,
wherein a movable lens unit closest to the image side in the at least three movable lens units has a positive refractive power, and a movable lens unit second closest to the image side in the at least three movable lens units has a negative refractive power,
wherein a movable lens unit having a strongest negative refractive power in the at least three movable lens units includes two negative lenses and one positive lens,
wherein the first lens unit includes:
a first sub unit closest to the object side and configured not to move for focusing; and
a second sub unit configured to move for focusing,
wherein the final lens unit includes a positive lens closest to the image side in elements having a refractive power in the final lens unit,
wherein following inequalities are satisfied:

$62 \leq vdp \leq 81.54$, $2.24 \leq Ndp + 0.01 vdp$, $4 \leq Z \leq 50$, and $2.5 \leq Le/fw \leq 5.46$ ere vdp represents an Abbe number with respect to a d-line of the positive lens, Ndp represents a refractive index with respect to the d-line of the positive lens, Z represents a zoom ratio of the zoom lens, Le represents a distance on an optical axis from a lens surface closest to the object side in the final lens unit to an image side surface of the positive lens in the final lens unit, and fw represents a focal length of the zoom lens at a wide-angle end.

* * * * *